(12) United States Patent
Kumada et al.

(10) Patent No.: US 10,232,853 B2
(45) Date of Patent: Mar. 19, 2019

(54) CONTROL DEVICE AND CONTROL METHOD FOR VEHICLE

(71) Applicant: NISSAN MOTOR CO., LTD., Yokohama-shi, Kanagawa (JP)

(72) Inventors: Mitsunori Kumada, Kanagawa (JP); Ryohey Toyota, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 192 days.

(21) Appl. No.: 15/509,297

(22) PCT Filed: Sep. 9, 2014

(86) PCT No.: PCT/JP2014/073818
§ 371 (c)(1),
(2) Date: Mar. 7, 2017

(87) PCT Pub. No.: WO2016/038689
PCT Pub. Date: Mar. 17, 2016

(65) Prior Publication Data
US 2017/0274902 A1     Sep. 28, 2017

(51) Int. Cl.
*B60W 30/188*     (2012.01)
*B60L 11/18*     (2006.01)
(Continued)

(52) U.S. Cl.
CPC ......... *B60W 30/188* (2013.01); *B60L 3/0046* (2013.01); *B60L 11/18* (2013.01);
(Continued)

(58) Field of Classification Search
CPC .... B60W 30/188; B60W 10/08; B60W 10/10; B60W 2510/084; B60L 2240/423
See application file for complete search history.

(56) References Cited

U.S. PATENT DOCUMENTS 8,123,655 B2 *   2/2012   Endo ..................... B60K 6/365
                                                                          477/5
2002/0060551 A1   5/2002   Ikeda
(Continued)

FOREIGN PATENT DOCUMENTS

CA        2 898 292 A1    7/2014
EP          0781680 A2 *   7/1997  ............ B60K 6/485
(Continued)

*Primary Examiner* — Ramsey Refai
(74) *Attorney, Agent, or Firm* — Foley & Lardner LLP

(57) ABSTRACT

A control device for a vehicle includes a fuel cell, a motor-generator, a power unit, a transmission, a motor-generator control unit configured to perform a power control on the motor-generator based on a driver request torque, and a generated power control unit configured to control the generated power of the fuel cell based on a load of the fuel cell including the motor-generator. The motor-generator control unit performs a shifting power control for decreasing a rotation speed of the motor-generator during an upshift of the transmission, and a power control on the motor-generator based on a limit torque of the motor-generator during the shifting power control. The limit torque of the motor-generator being calculated based on an actual generated power of the fuel cell per unit time and an acceptable power of the power unit per unit time.

14 Claims, 23 Drawing Sheets

(51) Int. Cl.
   *H01M 8/04*        (2016.01)
   *B60L 3/00*        (2019.01)
   *B60W 30/19*       (2012.01)
   *F16H 61/04*       (2006.01)
   *B60W 10/08*       (2006.01)
   *B60W 10/10*       (2012.01)
   *H01M 8/04858*     (2016.01)

(52) U.S. Cl.
   CPC ....... *B60L 11/1803* (2013.01); *B60L 11/1879* (2013.01); *B60L 11/1881* (2013.01); *B60L 11/1883* (2013.01); *B60L 11/1898* (2013.01); *B60W 10/08* (2013.01); *B60W 10/10* (2013.01); *B60W 30/19* (2013.01); *F16H 61/0403* (2013.01); *H01M 8/04* (2013.01); *H01M 8/04932* (2013.01); *B60L 2210/10* (2013.01); *B60L 2210/30* (2013.01); *B60L 2210/40* (2013.01); *B60L 2240/423* (2013.01); *B60L 2240/427* (2013.01); *B60L 2240/486* (2013.01); *B60W 2510/084* (2013.01); *B60W 2510/086* (2013.01); *B60W 2510/104* (2013.01); *B60W 2510/1005* (2013.01); *B60W 2510/1015* (2013.01); *B60W 2710/082* (2013.01); *B60W 2710/087* (2013.01); *B60W 2710/1005* (2013.01); *B60W 2710/1011* (2013.01); *B60W 2710/1038* (2013.01); *B60W 2710/28* (2013.01); *F16H 2061/0422* (2013.01); *H01M 2250/20* (2013.01); *H01M 2250/407* (2013.01); *Y02T 10/7258* (2013.01); *Y02T 90/32* (2013.01); *Y02T 90/34* (2013.01)

(56) References Cited

U.S. PATENT DOCUMENTS

| | | | |
|---|---|---|---|
| 2009/0146615 A1* | 6/2009 | Zillmer | B60K 6/48 322/23 |
| 2009/0223727 A1* | 9/2009 | Tolksdorf | B60K 6/365 180/65.26 |
| 2010/0102767 A1 | 4/2010 | Endo et al. | |
| 2010/0200318 A1 | 8/2010 | Wallner | |
| 2014/0172211 A1* | 6/2014 | Kim | B60L 15/2009 701/22 |
| 2018/0022341 A1* | 1/2018 | Jang | B60W 20/14 701/22 |

FOREIGN PATENT DOCUMENTS

| | | | | |
|---|---|---|---|---|
| EP | 1762417 A1 * | 3/2007 | | B60K 6/48 |
| JP | 2002-165303 A | 6/2002 | | |
| JP | 2005-067559 A | 3/2005 | | |
| JP | 2008-154387 A | 7/2008 | | |
| JP | 2009-274643 A | 11/2009 | | |
| JP | 2013-208001 A | 10/2013 | | |
| WO | WO 2008/032221 A2 | 3/2008 | | |

\* cited by examiner

CONTROL DEVICE AND CONTROL METHOD FOR VEHICLE

TECHNICAL FIELD

The present invention relates to a control device and a control method for a vehicle.

BACKGROUND ART

JP2008-154387A discloses a conventional control device for a vehicle that includes a fuel cell, a motor, and a transmission and decreases a torque of the motor during an upshift of the transmission with respect to a torque required by a driver to decrease a generated power of the fuel cell together.

SUMMARY OF INVENTION

This conventional control device for the vehicle has been configured to charge a surplus power generated by the decrease of the motor torque to a battery during the upshift. However, if the power charged to the battery during the upshift exceeds an acceptable power (chargeable power) per unit time of the battery, the battery is possibly deteriorated due to such as a heat generation. Thus, the conventional control device for the vehicle has room for improvement in a power management during the upshift.

The present invention has been made in view of the above-described problems, and it is an object of the present invention to appropriately perform the power management during the upshift.

According to one aspect of the present invention, a control device for a vehicle is provided. The vehicle includes a fuel cell, a motor-generator coupled to the fuel cell as a driving source, a power unit configured to accept generated power of the fuel cell and the motor-generator, and a transmission disposed on a power transmission path between the motor-generator and a driving wheel. The control device for the vehicle comprises a motor-generator control unit configured to perform a power control on the motor-generator based on a driver request torque, and a generated power control unit configured to control the generated power of the fuel cell based on a load of the fuel cell including the motor-generator. The motor-generator control unit performs a shifting power control for decreasing a rotation speed of the motor-generator during an upshift of the transmission, and the motor-generator control unit performs a power control on the motor-generator based on a limit torque of the motor-generator during the shifting power control, the limit torque of the motor-generator being calculated based on an actual generated power of the fuel cell per unit time and an acceptable power of the power unit per unit time.

DESCRIPTION OF EMBODIMENTS

The following describes embodiments of the present invention with reference to such as drawings.

First Embodiment

A fuel cell 10 includes an electrolyte membrane between an anode electrode (fuel electrode) and a cathode electrode (oxidant electrode), and supplies anode gas (fuel gas) including hydrogen and cathode gas (oxidant gas) including oxygen respectively to the anode electrode and the cathode electrode to generate power. Electrode reactions that progress on both electrodes of the anode electrode and the cathode electrode are as follows.

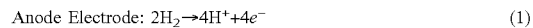

Anode Electrode: $2H_2 \rightarrow 4H^+ + 4e^-$     (1)

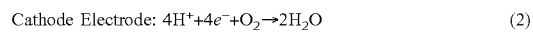

Cathode Electrode: $4H^+ + 4e^- + O_2 \rightarrow 2H_2O$     (2)

The electrode reactions (1) and (2) cause the fuel cell 10 to generate electromotive force of approximately one volt.

When the fuel cell 10 is used as a vehicular power source, the fuel cell 10 is used as a fuel cell stack 110 where several hundreds of fuel cells are laminated because a required power is large. Then, a fuel cell system 100 for supplying the anode gas and the cathode gas to the fuel cell stack 110 is configured to take out the power for driving the vehicle.

Figure 1:
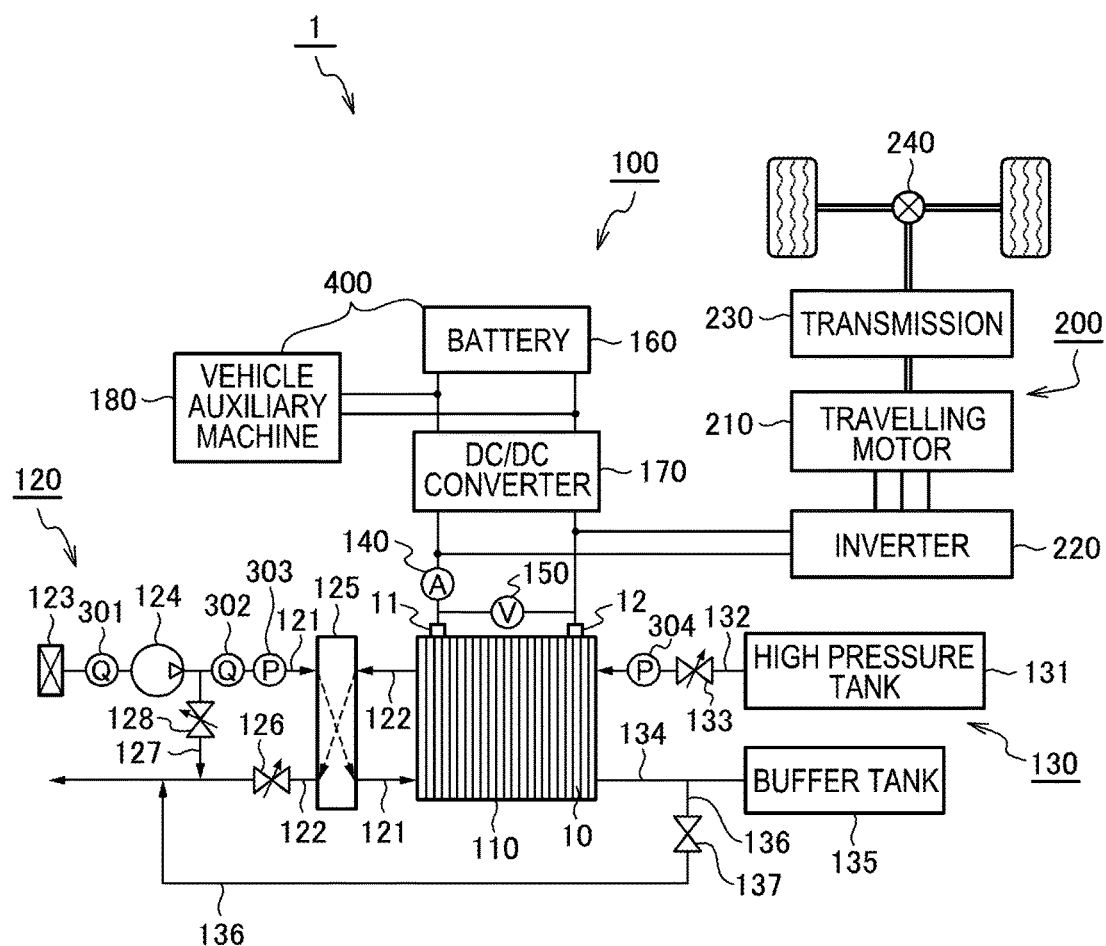
FIG. 1 is a schematic configuration diagram of a vehicle according to a first embodiment of the present invention.

FIG. 1 is a schematic configuration diagram of a vehicle 1 according to a first embodiment of the present invention.

The vehicle 1 includes the fuel cell system 100, a drive system 200, and a controller 300.

The fuel cell system 100 includes the fuel cell stack 110, a cathode gas supplying/discharging device 120, an anode gas supplying/discharging device 130, a current sensor 140, a voltage sensor 150, a battery 160, a converter 170, and a vehicle auxiliary machine 180.

The fuel cell stack 110 is constituted of a plurality of laminated fuel cells 10 to be supplied with the anode gas and the cathode gas to generate power necessary for driving the vehicle 1. The fuel cell stack 110 includes an anode electrode side output terminal 11 and a cathode electrode side output terminal 12 as terminals for taking out the power.

The cathode gas supplying/discharging device 120 supplies the fuel cell stack 110 with the cathode gas (air) and discharges a cathode off-gas discharged from the fuel cell stack 110 to external air. The cathode gas supplying/discharging device 120 includes a cathode gas supply passage 121, a cathode gas discharge passage 122, a filter 123, a cathode compressor 124, a water recovery device (Water Recovery Device; hereinafter referred to as a "WRD") 125, a cathode pressure control valve 126, a bypass passage 127, a bypass valve 128, a first air flow sensor 301, a second air flow sensor 302, and a cathode pressure sensor 303.

The cathode gas supply passage 121 is a passage where the cathode gas supplied to the fuel cell stack 110 flows. The cathode gas supply passage 121 includes one end coupled to the filter 123 and another end coupled to a cathode gas inlet hole of the fuel cell stack 110.

The cathode gas discharge passage 122 is a passage where the cathode off-gas discharged from the fuel cell stack 110 flows. The cathode gas discharge passage 122 includes one end coupled to a cathode gas outlet hole of the fuel cell stack 110 and another end as an opening end. The cathode off-gas is a mixed gas including oxygen not used for the electrode reaction, nitrogen contained in the cathode gas, water vapor generated by the electrode reaction, and similar gas.

The filter 123 removes foreign matters in the cathode gas taken into the cathode gas supply passage 121.

The cathode compressor 124 is disposed on the cathode gas supply passage 121. The cathode compressor 124 takes air as the cathode gas into the cathode gas supply passage 121 via the filter 123 to supply the fuel cell stack 110 with the air.

The WRD 125 is coupled to the respective cathode gas supply passage 121 and cathode gas discharge passage 122. The WRD 125 recovers moisture in the cathode off-gas flowing through the cathode gas discharge passage 122 to humidify the cathode gas flowing through the cathode gas supply passage 121 with the recovered moisture. It should be noted that an intercooler for cooling the cathode gas can be disposed on the cathode gas supply passage 121 between the cathode compressor 124 and the WRD 125.

The cathode pressure control valve 126 is disposed on the cathode gas discharge passage 122 on a downstream with respect to the WRD 125. The cathode pressure control valve 126 is controlled to open and close by the controller 300 to adjust a pressure of the cathode gas supplied to the fuel cell stack 110 to a desired pressure. It should be noted that, a configuration where a throttle such as an orifice is disposed instead of disposing the cathode pressure control valve 126 may be employed.

The bypass passage 127 is a passage disposed so as to discharge a part of the cathode gas, discharged from the cathode compressor 124, directly to the cathode gas discharge passage 122 as necessary without via the fuel cell stack 110. The bypass passage 127 includes one end coupled to the cathode gas supply passage 121 between the cathode compressor 124 and the WRD 125 and another end coupled to the cathode gas discharge passage 122 on a downstream with respect to the cathode pressure control valve 126.

The bypass valve 128 is disposed on the bypass passage 127. The bypass valve 128 is controlled to open and close by the controller 300 to adjust a flow rate of the cathode gas flowing through the bypass passage 127 (hereinafter referred to as a "bypass flow rate").

The first air flow sensor 301 is disposed on the cathode gas supply passage 121 on an upstream with respect to the cathode compressor 124. The first air flow sensor 301 detects a flow rate (hereinafter referred to as a "compressor supply flow rate") of the cathode gas supplied to the cathode compressor 124. Hereinafter, the value detected by the first air flow sensor 301 is referred to as a "detected compressor supply flow rate."

The second air flow sensor 302 is disposed on the cathode gas supply passage 121 on a downstream with respect to a coupling portion to the bypass passage 127. The second air flow sensor 302 detects a flow rate (hereinafter referred to as a "stack supply flow rate") of the cathode gas supplied to the fuel cell stack 110 in the cathode gas discharged from the cathode compressor 124. The stack supply flow rate is a flow rate obtained by subtracting the bypass flow rate from the compressor supply flow rate. Hereinafter, the value detected by the second air flow sensor 302 is referred to as a "detected stack supply flow rate."

The cathode pressure sensor 303 is disposed on the cathode gas supply passage 121 near the cathode gas inlet side of the WRD 125. The cathode pressure sensor 303 detects a pressure of the cathode gas near the cathode gas inlet side of the WRD 125. In other words, the cathode pressure sensor 303 detects the pressure of the cathode gas supplied to the fuel cell stack 110. Hereinafter, the value detected by the cathode pressure sensor 303 is referred to as a "detected cathode pressure."

The anode gas supplying/discharging device 130 supplies the fuel cell stack 110 with the anode gas, and discharges an anode off-gas discharged from the fuel cell stack 110 to the cathode gas discharge passage 122. The anode gas supplying/discharging device 130 includes a high pressure tank 131, an anode gas supply passage 132, an anode pressure control valve 133, an anode pressure sensor 304, an anode gas discharge passage 134, a buffer tank 135, a purge passage 136, and a purge valve 137.

The high pressure tank 131 keeps the anode gas (hydrogen) supplied to the fuel cell stack 110 in a high pressure state to storage.

The anode gas supply passage 132 is a passage to supply the anode gas discharged from the high pressure tank 131 to the fuel cell stack 110. The anode gas supply passage 132 includes one end coupled to the high pressure tank 131 and another end coupled to an anode gas inlet hole of the fuel cell stack 110.

The anode pressure control valve 133 is disposed on the anode gas supply passage 132. The anode pressure control valve 133 is controlled to open and close by the controller 300 to adjust a pressure of the anode gas supplied to the fuel cell stack 110 to a desired pressure.

The anode pressure sensor 304 is disposed on the anode gas supply passage 132 on a downstream with respect to the anode pressure control valve 133, and detects a pressure (hereinafter referred to as an "anode pressure") of the anode gas supplied to the fuel cell stack 110. In this embodiment, the anode pressure is used as a pressure in an anode system from the fuel cell stack 110 to the buffer tank 135.

The anode gas discharge passage 134 includes one end coupled to an anode gas outlet hole of the fuel cell stack 110 and another end coupled to the buffer tank 135. To the anode gas discharge passage 134, a mixed gas (hereinafter, referred to as an "anode off-gas") including excess anode gas not used for the electrode reaction and inert gas containing such as nitrogen and moisture (generated water and water vapor), which are transmitted from the cathode side to the anode side in the fuel cell, is discharged.

The buffer tank 135 once stores the anode off-gas flowing through the anode gas discharge passage 134. The anode off-gas stored in the buffer tank 135 is discharged to the cathode gas discharge passage 122 passing through the purge passage 136 when the purge valve 137 is opened.

The purge passage 136 includes one end coupled to the anode gas discharge passage 134 and another end coupled to the cathode gas discharge passage 122.

The purge valve 137 is disposed on the purge passage 136. The purge valve 137 is controlled to open and close by the controller 300 to control a flow rate (hereinafter referred to as a "purge flow rate") of the anode off-gas discharged from the anode gas discharge passage 134 to the cathode gas discharge passage 122.

The anode off-gas discharged to the cathode gas discharge passage 122 via the anode gas discharge passage 134 is mixed with the cathode off-gas in the cathode gas discharge passage 122 to be discharged to the outside of the fuel cell system 100. Since the anode off-gas contains excess hydrogen not used for the electrode reaction, mixing the anode off-gas with the cathode off-gas to discharge to the outside of the fuel cell system 100 causes a hydrogen concentration of the discharged gas to be equal to or less than a predetermined concentration.

The current sensor 140 detects a current (hereinafter referred to as an "output current") taken out from the fuel cell stack 110.

The voltage sensor 150 detects an inter-terminal voltage (hereinafter referred to as an "output voltage") between the anode electrode side output terminal 11 and the cathode electrode side output terminal 12. The voltage sensor 150 detects a voltage (hereinafter referred to as a "cell voltage") of each fuel cell 10 constituting the fuel cell stack 110, and detects a total voltage of the fuel cells 10 as the output voltage. It should be noted that a configuration to detect a voltage per a plurality of the fuel cells 10 (cell group voltage) may be employed.

The battery 160 is a chargeable/dischargeable secondary battery. The battery 160 is charged with an excess of the generated power of the fuel cell stack 110 (output current× output voltage) and a regenerative power of a travelling motor 210. The power charged in the battery 160 is supplied to the vehicle auxiliary machine 180 such as the cathode compressor 124 and the travelling motor 210 as necessary.

The converter 170 is a bidirectional DC voltage convertor that includes a plurality of switching elements and a reactor to step up/down the output voltage of the fuel cell stack 110. Controlling the output voltage of the fuel cell stack 110 by the converter 170 controls the output current, eventually, the generated power of the fuel cell stack 110 to control the charge/discharge of the battery 160.

The vehicle auxiliary machine 180 is an electrical device such as the cathode compressor 124 other than the travelling motor 210 driven in the operation of the vehicle 1.

The drive system 200 includes the travelling motor (motor-generator) 210, an inverter 220, and a transmission 230.

The travelling motor 210 is a driving source to drive the vehicle 1. The travelling motor 210 is a three-phase AC synchronous motor that includes a rotor on which a permanent magnet is buried and a stator around which a stator coil is wound. The travelling motor 210 has a function as an electric motor supplied with the power from the fuel cell stack 110 and the battery 160 to be rotatably driven, and a function as an electric generator to generate the electromotive force on both ends of the stator coil during deceleration of the vehicle 1 where the rotor is rotated by an external force.

The inverter 220 is constituted of the plurality of switching elements such as Insulated Gate Bipolar Transistor (IGBT). The switching elements of the inverter 220 are controlled to open and close by the controller 300 to convert a DC power to an AC power, or an AC power to a DC power. The inverter 220 converts a composite DC power of the generated power of the fuel cell stack 110 and the output power of the battery 160 to the three-phase AC power to supply to the travelling motor 210 in causing the travelling motor 210 to function as the electric motor. On the other hand, the inverter 220 converts the regenerative power (three-phase AC power) of the travelling motor 210 to the DC power to supply to the battery 160 in causing the travelling motor 210 to function as the electric generator.

The transmission 230 is an automatic transmission with two stages for forward, and coupled to an output shaft of the travelling motor 210. The output shaft of the transmission 230 is coupled to a drive shaft of a wheel via a differential gear 240. The transmission 230 changes a rotation speed (hereinafter referred to as a "motor rotation speed") of the output shaft of the travelling motor 210 to transmit to the drive shaft.

The controller 300 is configured of a microcomputer including a central processing unit (CPU), a read-only memory (ROM), a random access memory (RAM) and an input/output interface (I/O interface).

To the controller 300, signals are input from various sensors of an accelerator stroke sensor 310 that detects a depression amount of an accelerator pedal (hereinafter referred to as an "accelerator depression amount") corresponding to a load of the fuel cell stack 110, a first rotation speed sensor 311 that detects the motor rotation speed (=input rotation speed of the transmission), a second rotation speed sensor 312 that detects the output rotation speed of the transmission 230, and similar sensor other than such as the above-described voltage sensor 150.

The controller 300 calculates a target value of the generated power (first target value) based on a requested power of the travelling motor 210, a requested power of the vehicle auxiliary machine 180, and a charge/discharge request of the battery 160.

The controller 300 performs a feedback control on the cathode compressor 124 and the bypass valve 128 so as to simultaneously satisfy a stack request and a dilution request. Here, the stack request is a request to cause the fuel cell stack 110 to generate the power in an appropriate state in consideration of such as ensuring an oxygen partial pressure, a wet/dry state of an electrolyte membrane in causing the generated power to reach to the target value. The dilution request is a request to cause the hydrogen concentration in the exhaust gas discharge to the outside of the fuel cell system 100 to be equal to or less than the predetermined concentration.

That is, the controller 300 sets a greater value of a compressor supply flow rate (hereinafter referred to as a "stack request compressor supply flow rate") necessary to satisfy the stack request and a compressor supply flow rate (hereinafter referred to as a "dilution request compressor supply flow rate") necessary to satisfy the dilution request as a target compressor supply flow rate to perform the feedback control to a cathode compressor 124 so as to cause the detected compressor supply flow rate to come to the target compressor supply flow rate.

Then, when the dilution request compressor supply flow rate is set as the target compressor supply flow rate, the cathode compressor 124 is required to supply the cathode gas equal to or more than the stack request compressor supply flow rate. Therefore, the excess cathode gas not necessary for the electric generation is supplied to the fuel cell stack 110.

Then, when the dilution request compressor supply flow rate is set as the target compressor supply flow rate, the controller 300 controls the bypass valve 128 so as to cause the excess cathode gas not necessary for the electric generation to flow to the bypass passage 127. Specifically, the controller 300 controls the bypass valve 128 so as to cause the detected stack supply flow rate to come to the stack request compressor supply flow rate.

Thus in this embodiment, the value detected by the first air flow sensor 301 (detected compressor supply flow rate) is used for the control of the cathode compressor 124, and the value detected by the second air flow sensor 302 (detected stack supply flow rate) is used for the control of the bypass valve 128.

The controller 300 shifts the transmission gear of the transmission 230 based on the operating state of the vehicle 1.

Figure 2:
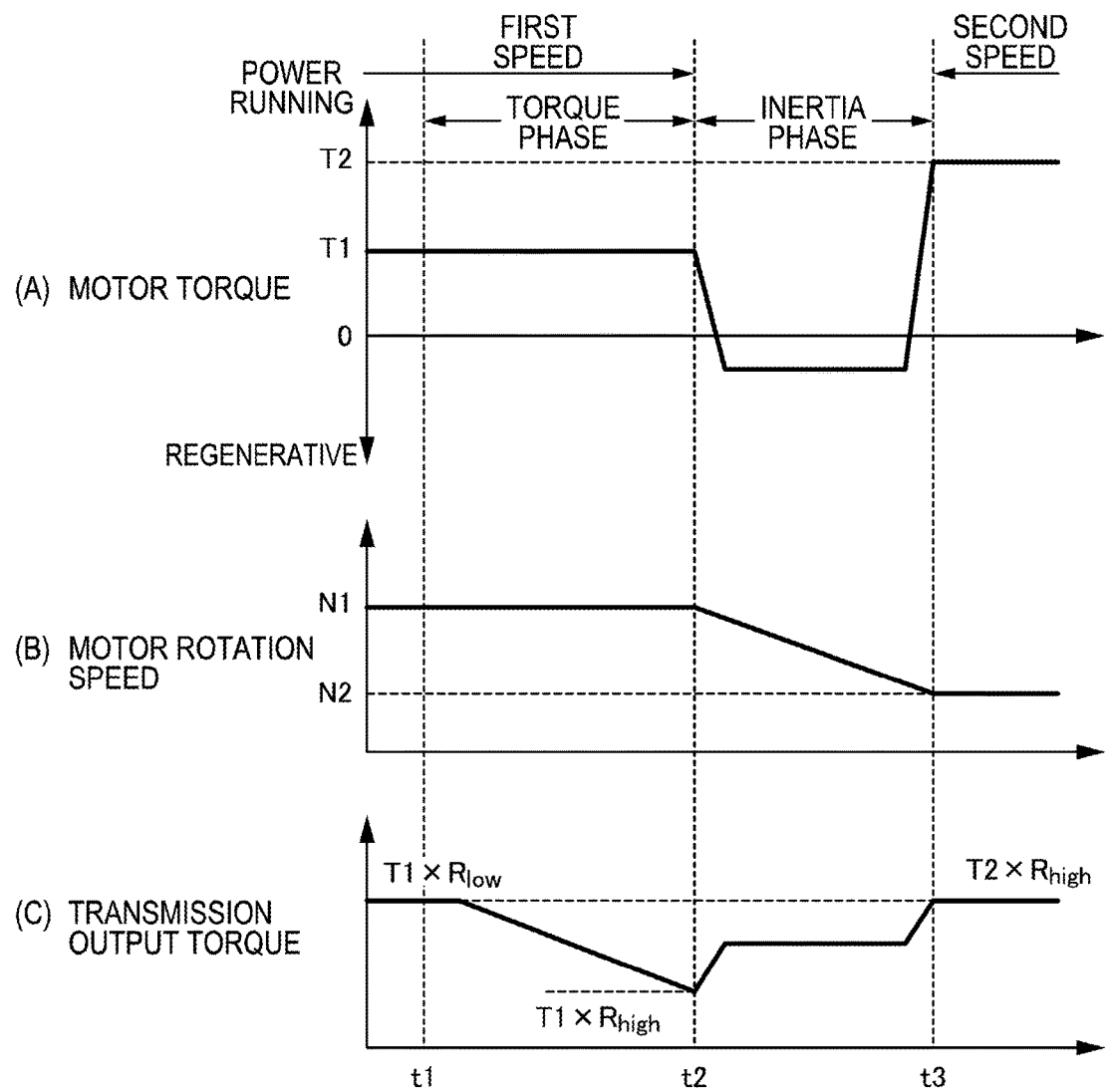
FIG. 2 is a timing chart indicating an upshift gear change in which a transmission gear of a transmission is shifted from a first speed to a second speed.

FIG. 2 is a timing chart indicating an upshift gear change in which the transmission gear of the transmission 230 is shifted from a first speed to a second speed.

As illustrated in FIG. 2, the upshift gear change is completed through a torque phase and an inertia phase. The torque phase is one of shift phases that occurs during the progress of the upshift gear change, and is a shift phase where the motor rotation speed does not vary while a torque (hereinafter referred to as a "transmission output torque") of the output shaft of the transmission 230 varies. The inertia phase is one of the shift phases that occurs during the progress of the upshift gear change, and is a shift phase where an inertia of a drive system varies to vary the motor rotation speed. Specifically, in a situation of the upshift gear change, the motor rotation speed decrease from a pre-shift rotation speed N1 to a rotation speed N2 obtained by multiplying N1 by a ratio of a second speed gear ratio $R_{high}$ to a first speed gear ratio $R_{low}$ (N2=N1×$R_{high}$/$R_{low}$).

The upshift gear change is started at a time t1, and when the torque phase starts, it is started to open a clutch of the first speed side of the transmission 230 while a clutch of the second speed side is engaged. This causes the motor rotation speed to remain at the pre-shift motor rotation speed N1 while the transmission output torque gradually decreases. That is, the transmission output torque decreases from a torque value obtained by multiplying a pre-shift motor torque T1 by the first speed gear ratio $R_{low}$ (T1×$R_{low}$) toward a torque value obtained by multiplying the pre-shift motor torque T1 by the second speed gear ratio $R_{high}$ (T1×$R_{high}$).

When the transmission output torque decreases to the torque value (T1×$R_{high}$) obtained by multiplying the motor torque T1 by the second speed gear ratio $R_{high}$ at a time t2, the shift phase transitions to the inertia phase. In the inertia phase, the transmission 230 performs what is called a slip control to cause the motor rotation speed to decrease from N1 to N2. At that time, the motor torque is temporarily decreased to reduce the increase of the transmission output torque due to an inertia torque in accordance with the variation of the drive system rotation speed. When the inertia phase terminates, the motor torque is required to be increased from the pre-shift motor torque T1 to a post-shift target motor torque T2 so as not to generate a shock due to a torque level difference before and after the gear shifting. That is, the motor torque is required to be increased to the target motor torque T2 such that a post-shift transmission output torque (T2×$R_{high}$) corresponds to a pre-shift transmission output torque (T1×$R_{low}$).

Figure 3:
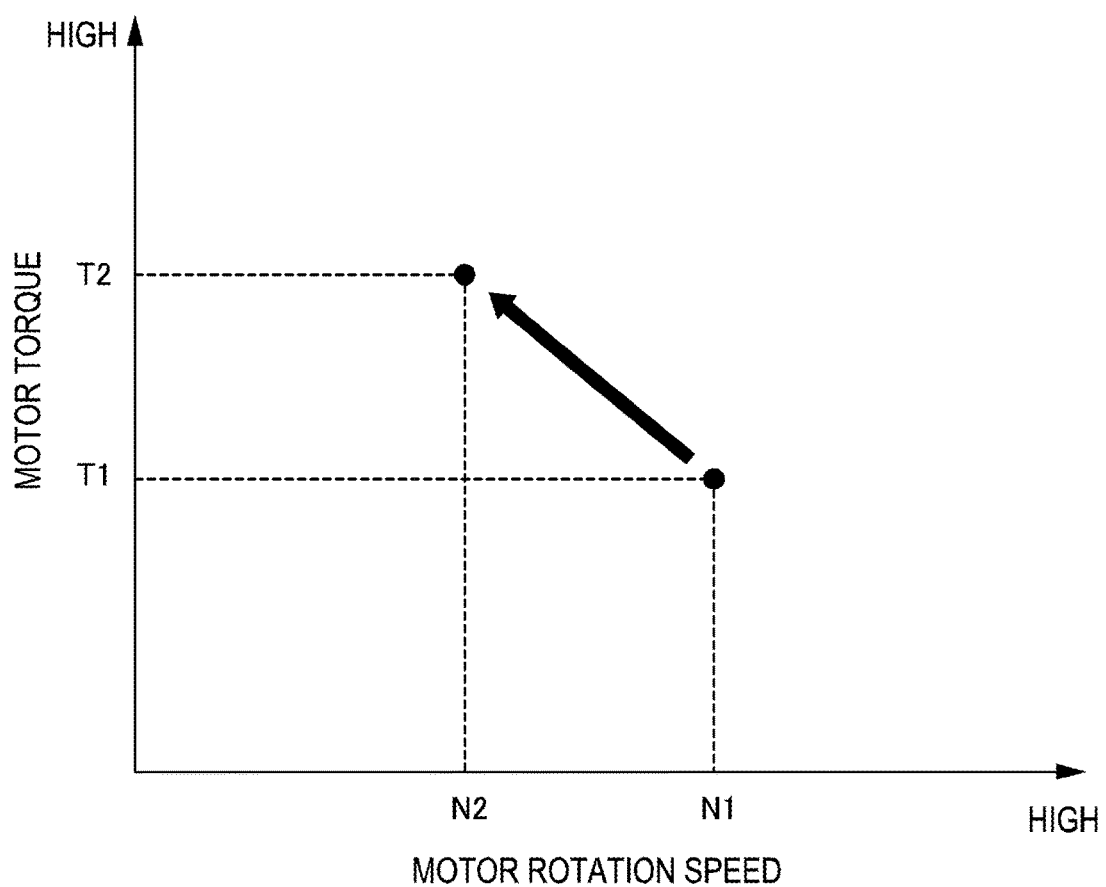
FIG. 3 indicates a relation between a motor rotation speed and a motor torque.

FIG. 3 indicates a relation between the motor rotation speed and the motor torque. The motor torque T2 when the motor rotation speed is N2 is higher than the motor torque T1 when the motor rotation speed is N1. Accordingly, the motor rotation speed is required to be decreased to increase the motor torque to the target motor torque T2. Here, it is effective for reducing the gear shift period to quickly decrease the motor rotation speed from the pre-shift motor rotation speed N1 to the motor rotation speed N2 corresponding to the target motor torque T2 to shorten the period of the inertia phase.

Therefore, in this embodiment, as illustrated in FIG. 2, when the shift phase transitions to the inertia phase at the time t2, the travelling motor 210 is temporarily switched from a power running operation to a regenerative operation. This quickly decreases the motor rotation speed from the pre-shift motor rotation speed N1 to the motor rotation speed N2 corresponding to the target motor torque T2.

At a time t3, the inertia phase terminates such that the travelling motor 210 is returned to the power running operation to output the motor torque T2 at a timing when the motor rotation speed decreases to N2.

Thus in this embodiment, the travelling motor 210 is temporarily switched from the power running operation to the regenerative operation to shorten the gear shift period during the inertia phase of the upshift gear change. This causes the following problems.

Figure 23:
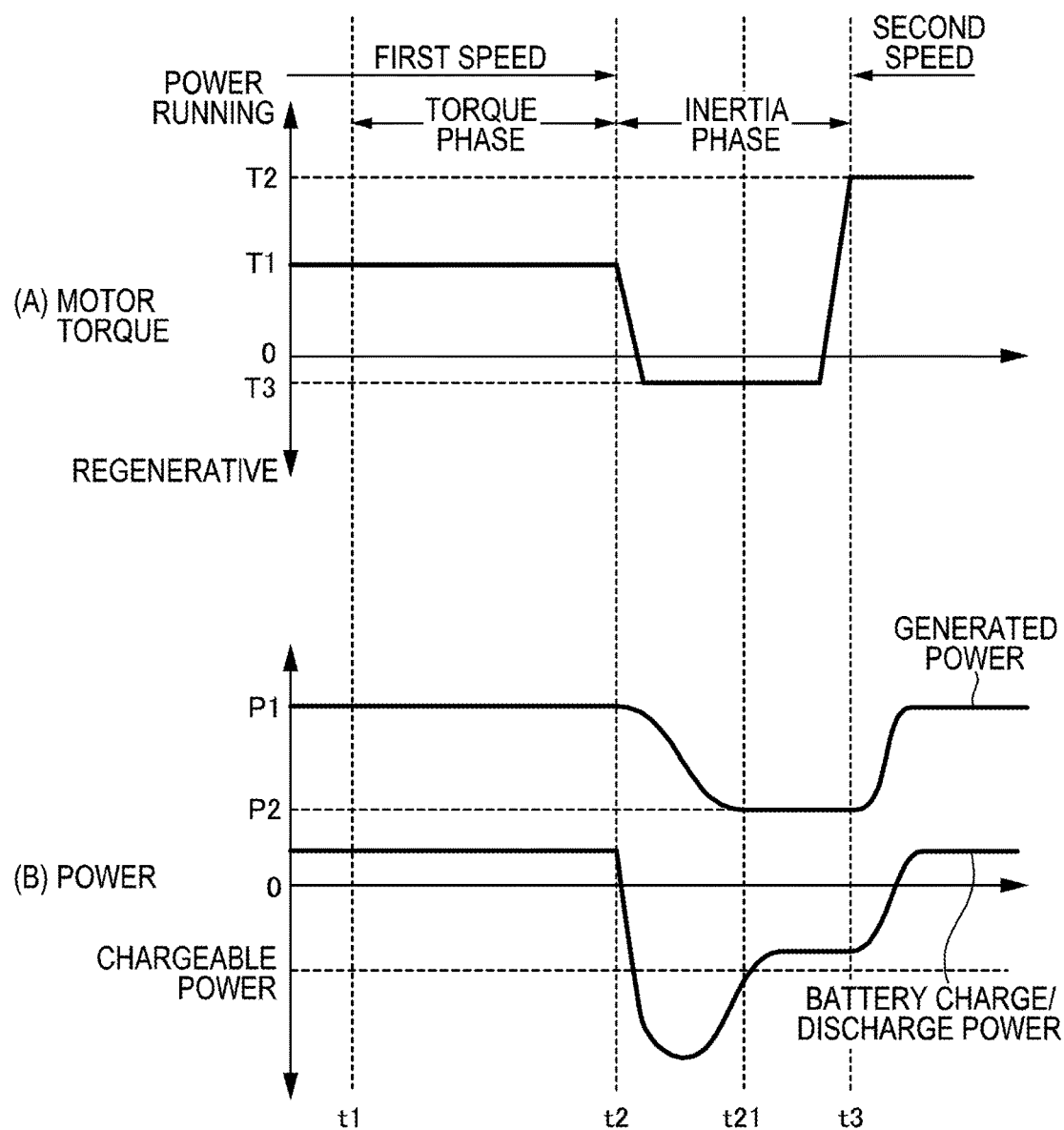
FIG. 23 is a timing chart indicating problems that occur during the inertia phase of the upshift gear change.

FIG. 23 is a timing chart indicating problems that occur during the inertia phase of the upshift gear change, and is a timing chart in a case where a motor torque control in a comparative embodiment, which is different from the motor torque control in this embodiment, is performed.

The generated power of the fuel cell stack 110 is usually controlled so as to be equivalent to a sum of power consumptions of the travelling motor 210 and the vehicle auxiliary machine 180. Therefore, when the shift phase transitions to the inertia phase at the time t2 and the travelling motor 210 is temporarily switched to the regenerative operation to decrease the motor rotation speed, the fuel cell stack 110 comes into a state to excessively generate the power by the amount of the power consumed by the travelling motor 210 until then. Accordingly, in the inertia phase, it is configured to decrease the generated power.

At this time, the travelling motor 210 is configured to be switched from the power running operation to the regenerative operation in stages. That is, the motor torque is configured to be varied from the pre-shift motor torque T1 toward a regenerative torque T3 to be targeted in stages. It is preferable to switch the travelling motor 210 from the power running operation to the regenerative operation in stages as described above to quickly decrease the motor rotation speed for reducing the gear shift period of the upshift gear change.

On the other hand, in case of decreasing the generated power, a time lag occurs to some extent corresponding to such as a length of the cathode gas supply passage before the flow rate of the cathode gas varies. Therefore, it is preferable to decrease the generated power from a pre-inertia phase generated power P1 toward a target value P2 with a predetermined time constant in accordance with a decrease speed of the flow rate of the cathode gas. When the excessive cathode gas is supplied, an output voltage tends to be increased compared with a case where the cathode gas commensurate with the amount of the generated power is supplied even if in a case where the generated power of the fuel cell stack 110 is controlled to an identical generated power. This is because an IV characteristic of the fuel cell stack changes due to an amount of oxygen in the stack. Then, basically, the output voltage increases as the generated power decreases because of the IV characteristic of the fuel cell stack 110. Accordingly, when the generated power is decreased in accordance with a response speed of the travelling motor 210, the generated power is decreased in a state where the flow rate of the cathode gas is excessive. As a result, the output voltage increases to cause the deterioration of such as a catalyst in the fuel cell 10. Further, as another reason why the generated power is decreased from the pre-inertia phase generated power P1 toward the target value P2 with the predetermined time constant, when the converter 170 is used to control the generated power of the fuel cell stack 110, the responsiveness of the converter 170 is slow compared with the travelling motor 210 to fail to decrease the generated power as the response of the travelling motor 210.

Accordingly, if the travelling motor 210 is switched from the power running operation to the regenerative operation in stages at the time t2 to improve the gear shift period, the travelling motor 210 comes to a state of the regenerative operation in a period from the time t2 to a time t21 where the generated power decreases from P1 to P2 regardless of the generated power not to be decreased to P2.

Therefore, during the period from the time t2 to the time t21, it is in a state where the fuel cell stack 110 excessively generates the power by the amount of the power consumed by the travelling motor 210 before the inertia phase, and further, in a state where a regenerative power (generated power) by the travelling motor 210 is generated. At this time, if a sum of the generated powers of the fuel cell stack 110 and the travelling motor 210 per unit time exceeds an upper limit value (hereinafter referred to as an "acceptable power") of the power acceptable by the battery 160 per unit time, the battery 160 is possibly deteriorated due to such as a heat generation. Thus, performing the upshift gear change considering only the improvement of the gear shift period possibly deteriorates the battery 160.

Accordingly, in this embodiment, a lower limit value of the motor torque is configured for preventing the battery 160 from the deterioration during the upshift gear change. The following describes the motor torque control according to the embodiment.

Figure 4:
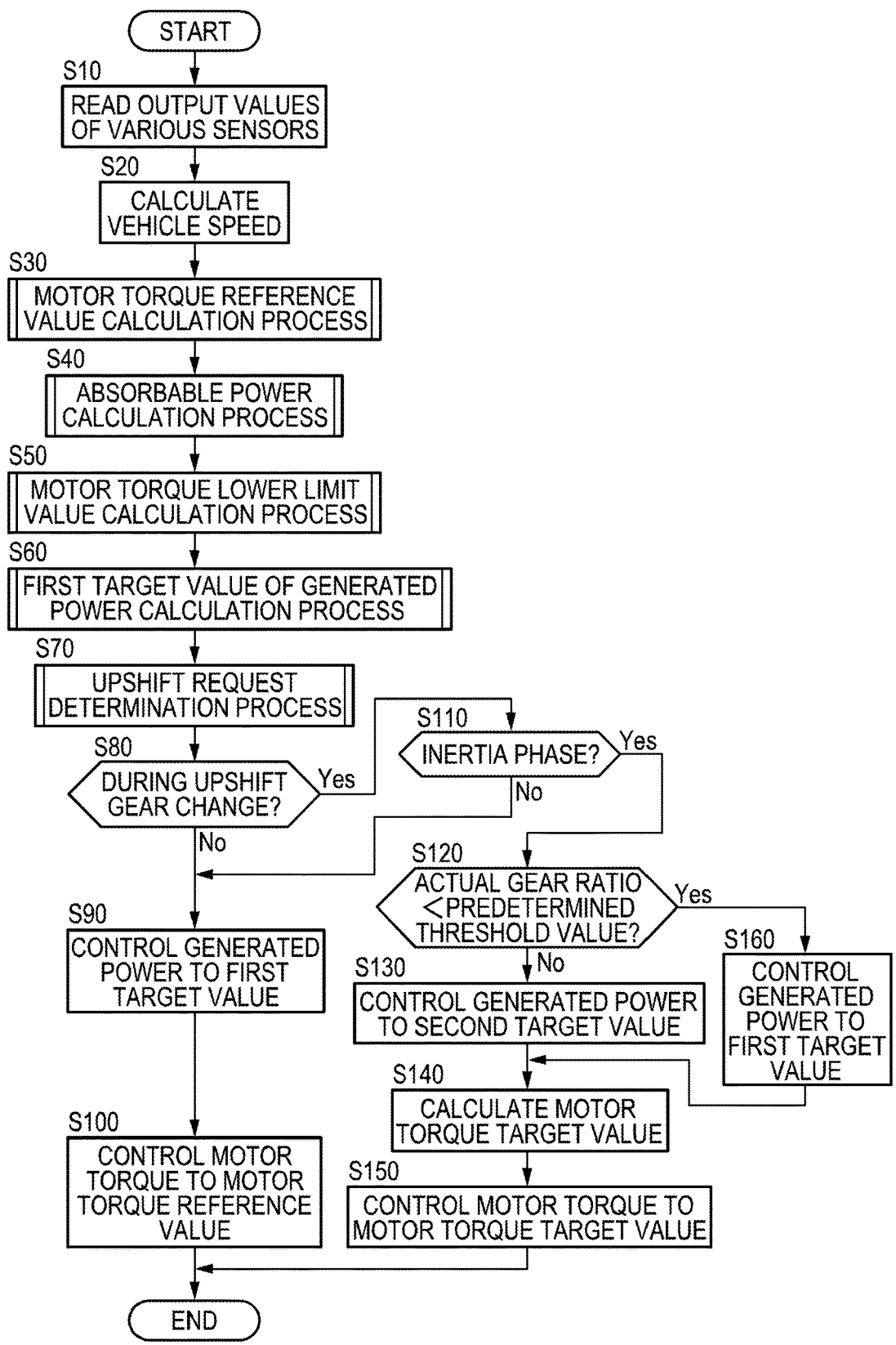
FIG. 4 is a flowchart indicating a motor torque control according to the embodiment.

FIG. 4 is a flowchart indicating the motor torque control according to the embodiment. The controller 300 repeatedly executes the routine with a predetermined operation period.

In Step S10, the controller 300 reads the output values of the various sensors.

In Step S20, the controller 300 calculates a vehicle speed based on the motor rotation speed, an actual gear ratio of the transmission 230 obtained by dividing the motor rotation speed by the rotation speed (hereinafter referred to as an "output rotation speed") of the output shaft of the transmission 230, and a wheel diameter and a reduction gear ratio of the differential gear 240, which are preliminarily stored in the ROM. It should be noted that the vehicle speed also can be calculated based on the output rotation speed of the transmission 230, the wheel diameter, and the reduction gear ratio.

In Step S30, the controller 300 executes a motor torque reference value calculation process. The motor torque reference value calculation process is a process to calculate a target value (hereinafter referred to as a "motor torque reference value") of the motor torque requested by a driver (driver request torque) based on an accelerator depression amount (load of the travelling motor 210) corresponding to the driver request. The motor torque reference value is, in other words, a target value of the motor torque required for causing a driving force of the vehicle 1 to reach a driving force (hereinafter referred to as a "required driving force") requested by the driver.

Figure 5:
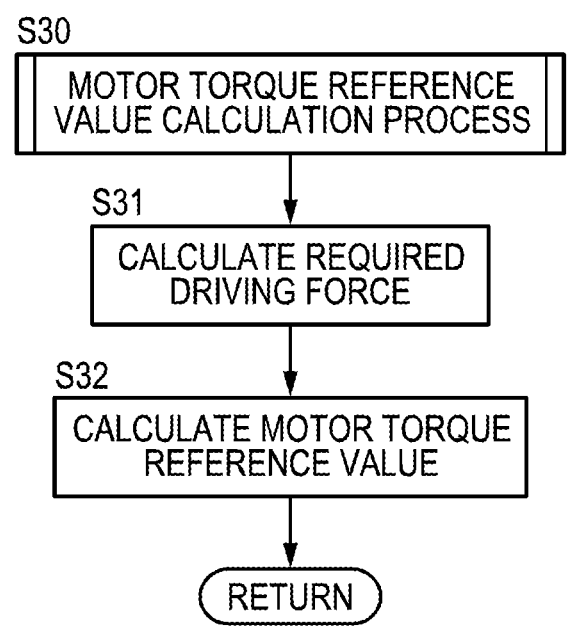
FIG. 5 is a flowchart indicating a motor torque reference value calculation process in detail.

FIG. 5 is a flowchart indicating a motor torque reference value calculation process in detail.

Figure 6:
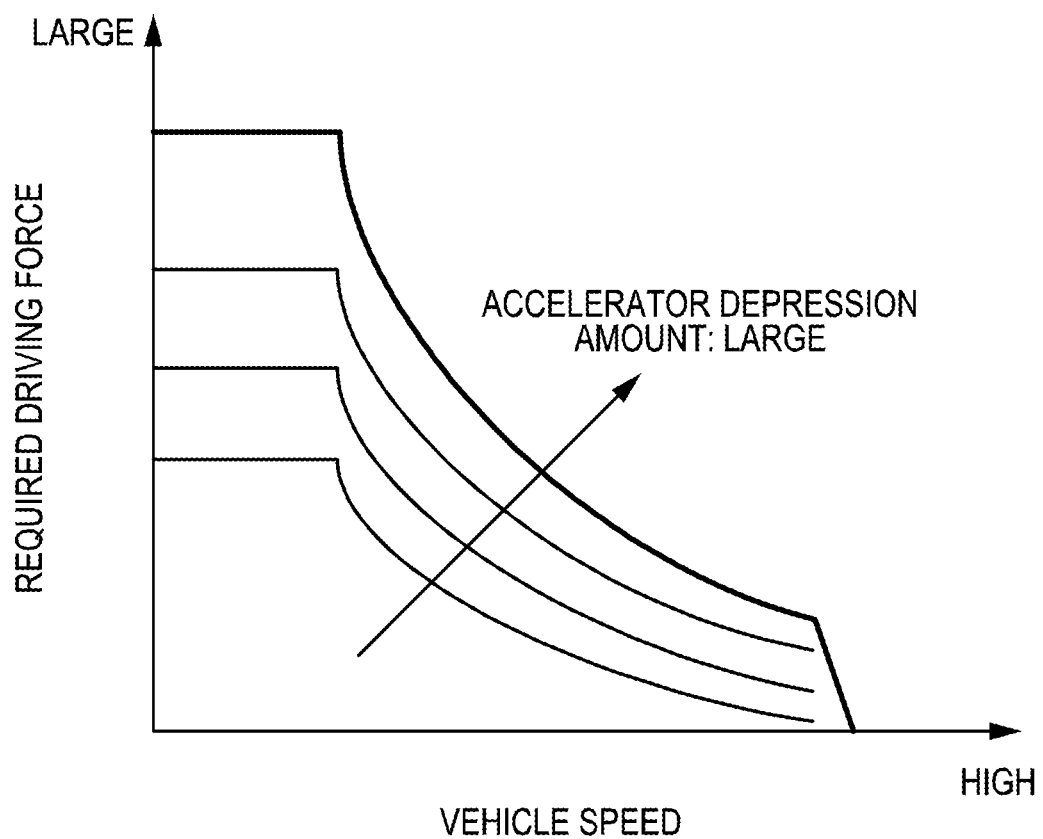
FIG. 6 is a map for calculating a required driving force.

In Step S31, the controller 300 calculates the required driving force based on the accelerator depression amount and the vehicle speed with reference to a required driving force map indicated in FIG. 6.

In Step S32, the controller 300 divides the required driving force by the actual gear ratio of the transmission 230 to calculate the motor torque reference value.

In Step S40, the controller 300 executes an absorbable power calculation process.

Figure 7:
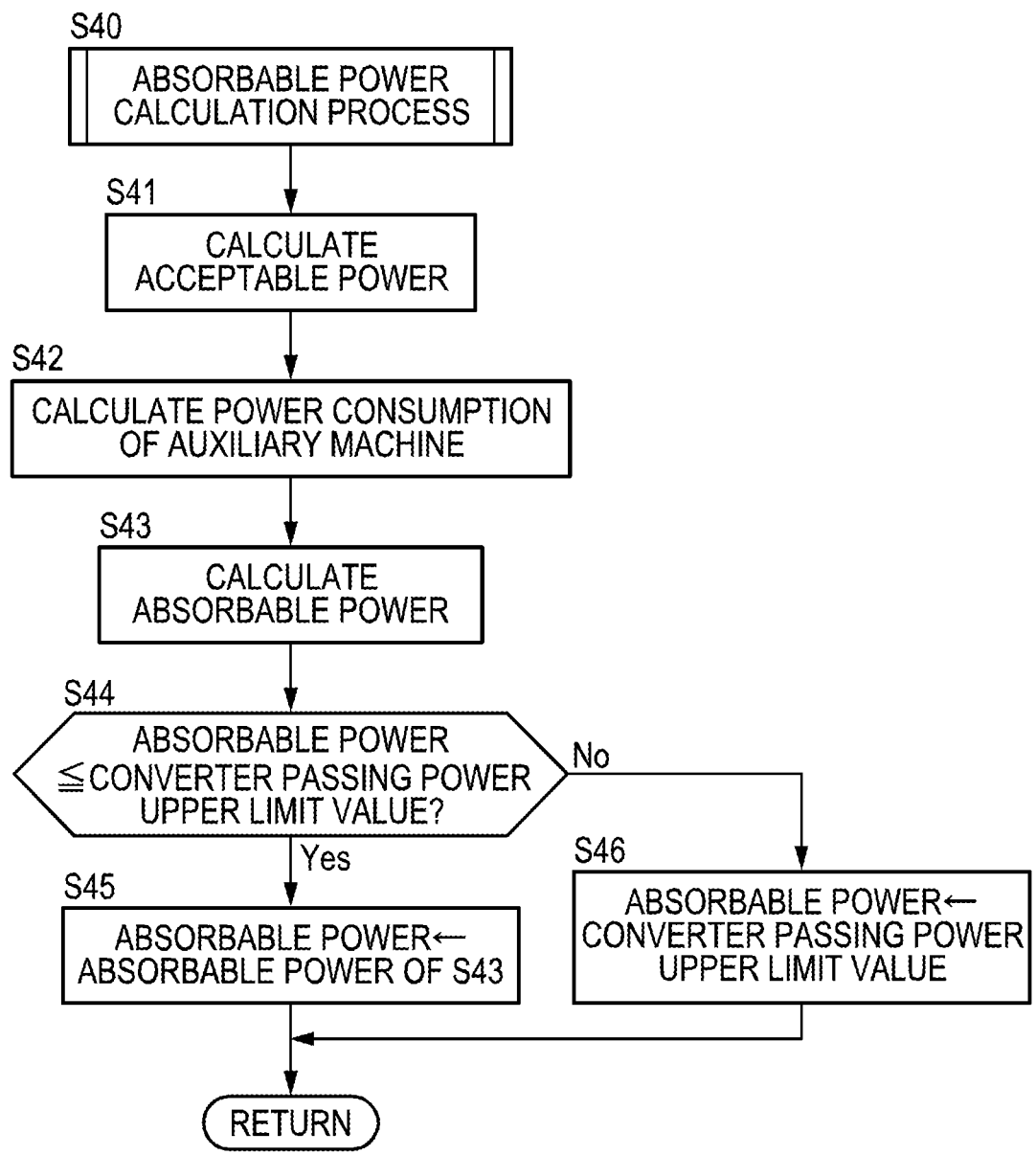
FIG. 7 is a flowchart indicating an absorbable power calculation process in detail.

FIG. 7 is a flowchart indicating the absorbable power calculation process in detail.

In Step S41, the controller 300 reads the preliminarily configured acceptable power of the battery 160. As described above, the acceptable power is a power acceptable by the battery 160 per unit time, that is, an upper limit value of chargeable power. It should be noted that a value with a margin with respect to the upper limit value may be configured as the acceptable power.

In Step S42, the controller 300 calculates a power consumption (hereinafter referred to as an "auxiliary machine power consumption") of the vehicle auxiliary machine 180 currently in operation. The auxiliary machine power consumption is, in other words, a power absorbable by the vehicle auxiliary machine 180.

In Step S43, the controller 300 calculates a sum of the acceptable power and the power consumption of the vehicle auxiliary machine 180 as an absorbable power. The absorbable power is, in other words, a maximum value of the power absorbable by the battery 160 and the vehicle auxiliary machine 180.

In this embodiment, the battery 160 and the vehicle auxiliary machine 180 are collectively referred to as a "power absorption unit (power unit) 400" as necessary. It should be noted that only the battery 160 can be configured as the power absorption unit 400.

In Step S44, the controller 300 determines whether or not the absorbable power is equal to or less than a converter passing power upper limit value.

When the power absorption unit 400 absorbs the generated power, the increase of the power (hereinafter referred to as a "converter passing power") passing through the converter 170 increases the current passing through the reactor as a component of the converter 170. If the current equal to or more than a rated current is flowed through the reactor, the reactor, eventually, the converter 170 is possibly deteriorated. Therefore, the converter passing power is configured to have a predetermined upper limit value for preventing the converter 170 from the deterioration.

Accordingly, while the power absorption unit 400 can absorb the entire absorbable power when the absorbable power is equal to or less than the converter passing power upper limit value, the power absorbed by the power absorption unit 400 is required to be restricted to the converter passing power upper limit value when the absorbable power is greater than the converter passing power upper limit value.

Then, when the absorbable power is equal to or less than the converter passing power upper limit value, the controller 300 proceeds to Step S45 to determine the absorbable power calculated in Step S43 as a final absorbable power as it is. On the other hand, when the absorbable power is greater than the converter passing power upper limit value, the controller 300 proceeds to Step S46 to determine the converter passing power upper limit value as the final absorbable power.

In Step S50, the controller 300 executes a motor torque lower limit value calculation process. The motor torque lower limit value calculation process is a process to calculate a lower limit value (hereinafter referred to as a "motor torque lower limit value") of the motor torque during the inertia phase of the upshift gear change.

Figure 8:
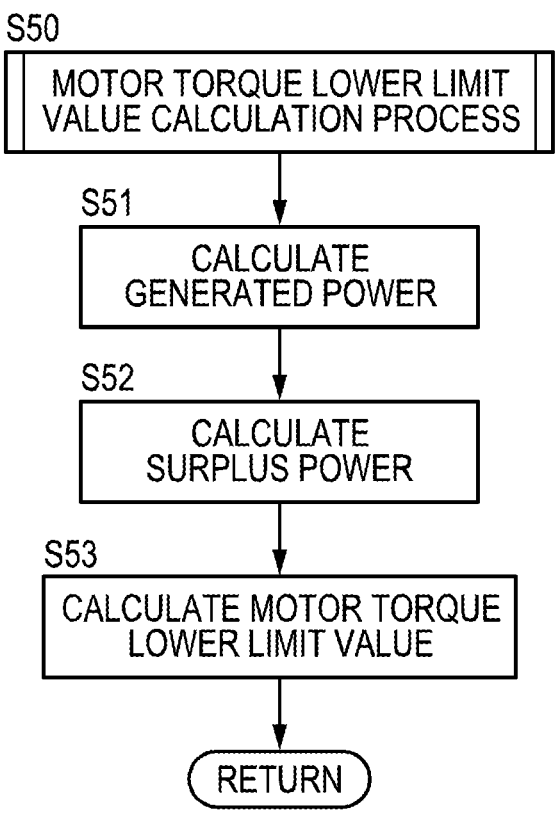
FIG. 8 is a flowchart indicating a motor torque lower limit value calculation process in detail.

FIG. 8 is a flowchart indicating the motor torque lower limit value calculation process in detail.

In Step S51, the controller 300 calculates the generated power of the fuel cell stack 110 based on the output current and the output voltage.

In Step S52, the controller 300 calculates the power by subtracting the absorbable power from the generated power as a "surplus power." When the surplus power is calculated as a positive value, it is a case where the fuel cell stack 110 generates the excessive power too much for the power absorption unit 400 to absorb, and the travelling motor 210 is required to consume the calculated surplus power. If the travelling motor 210 does not consume the surplus power, the charged power per unit time exceeds the acceptable power to cause the deterioration of the battery 160 due to such as the heat generation. On the other hand, when the surplus power is calculated as a negative value, it is a case where the negative amount can be regenerated by the travelling motor 210.

Figure 9:
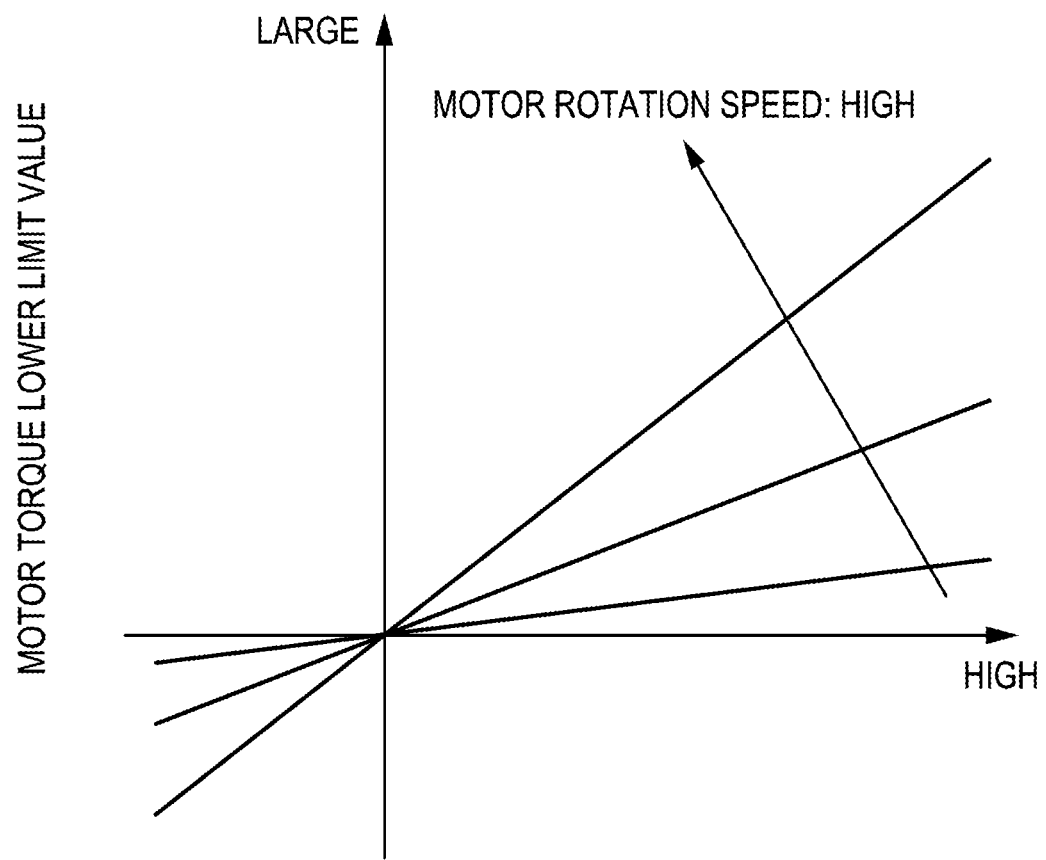
FIG. 9 is a map for calculating the motor torque lower limit value.

In Step S53, the controller 300 refers to a motor torque lower limit value map indicated in FIG. 9 to calculate the motor torque lower limit value based on the surplus power and the motor rotation speed. It should be noted that the motor rotation speed is not necessarily required in the calculation of the motor torque lower limit value, and the motor torque lower limit value may be calculated with only the surplus power. The motor torque lower limit value is, in other words, a lower limit value of the motor torque configured to prevent the battery 160 from being charged with the power equal to or more than the acceptable power during the inertia phase of the upshift gear change. The power control needs to be performed to the travelling motor 210 such that the motor torque comes to at least equal to or more than the motor torque lower limit value. Thus, setting the motor torque lower limit value based on the surplus power restricts a speed of the decrease of the power supplied to the motor-generator based on the excessive amount of the surplus power when the actual generated power of the fuel cell stack 110 per unit time exceeds the absorbable power (acceptable power) of the power absorption unit 400 per unit time.

In Step S60, the controller 300 executes a calculation process of a first target value of the generated power.

Figure 10:
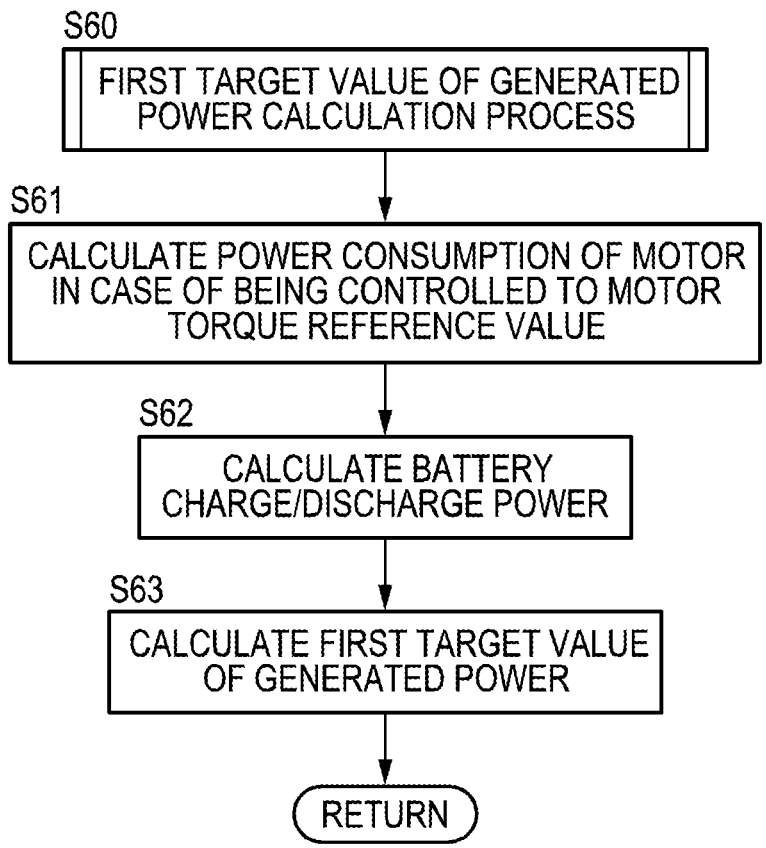
FIG. 10 is a flowchart indicating a calculation process of a first target value of a generated power.

FIG. 10 is a flowchart indicating the calculation process of the first target value of the generated power.

In Step S61, the controller 300 calculates the power consumed by the travelling motor 210 when the motor torque is controlled to the motor torque reference value. This power can be calculated based on the motor torque reference value with such as a preliminarily configured table where the motor torque reference value is associated with the power consumption of the travelling motor 210, for example.

Figure 11:
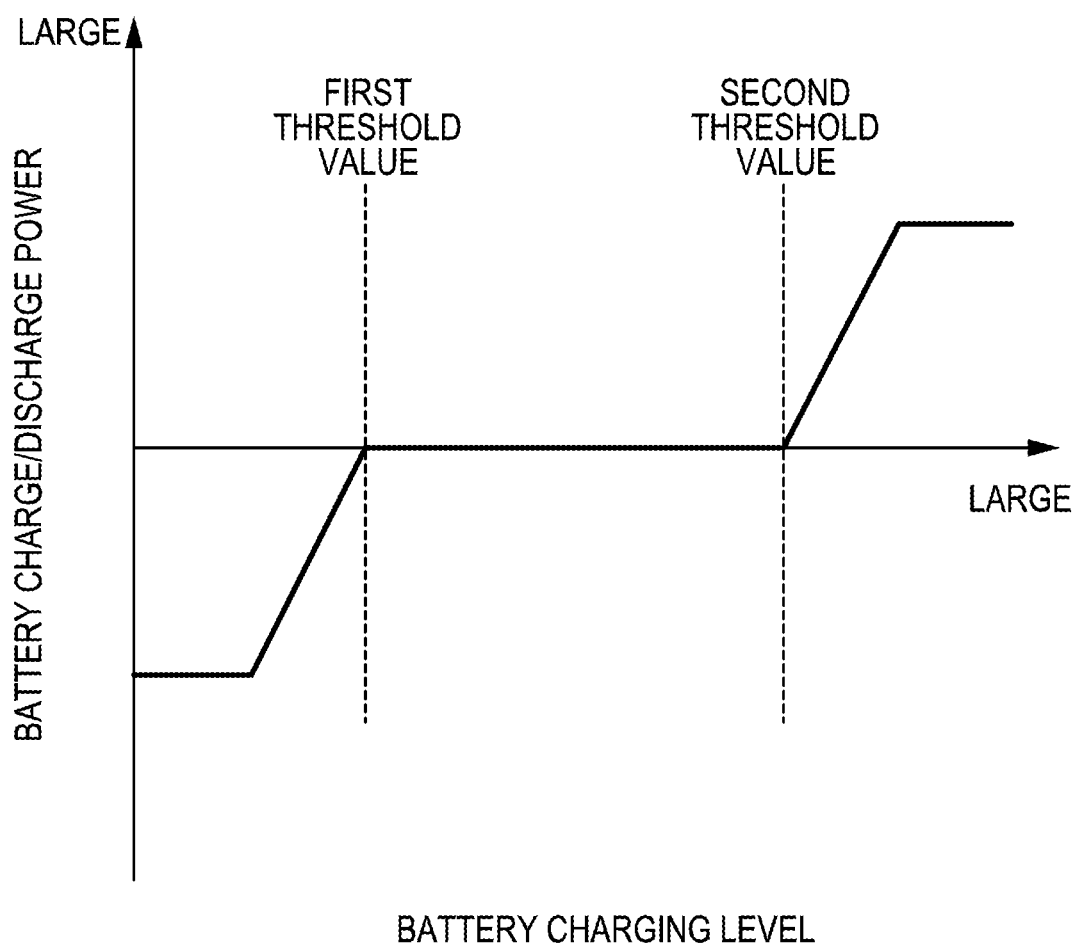
FIG. 11 is a table for calculating a battery charge/discharge power.

In Step S62, the controller 300 refers to a table indicated in FIG. 11 to calculate a battery charge/discharge power based on a battery charging level. As illustrated in FIG. 11, when the battery charging level comes to less than a first threshold value for preventing the battery 160 from an over discharge, a positive power value is calculated as the battery charge/discharge power to charge the power in the battery 160. On the other hand, when the battery charging level increases to greater than a second threshold value (>first threshold value) for preventing the battery 160 from an overcharge, a negative power value is calculated as the battery charge/discharge power to discharge the power from the battery 160.

In Step S63, the controller 300 calculates a sum of the power calculated in Step S61, the auxiliary machine power consumption, and the battery charge/discharge power as the first target value of the generated power. That is, the controller 300 calculates the first target value of the generated power based on a state of a load coupled to the fuel cell stack 110.

In Step S70, the controller 300 executes an upshift request determination process. The upshift request determination process is a process to determine whether or not an upshift request of the transmission 230 exists.

Figure 12:
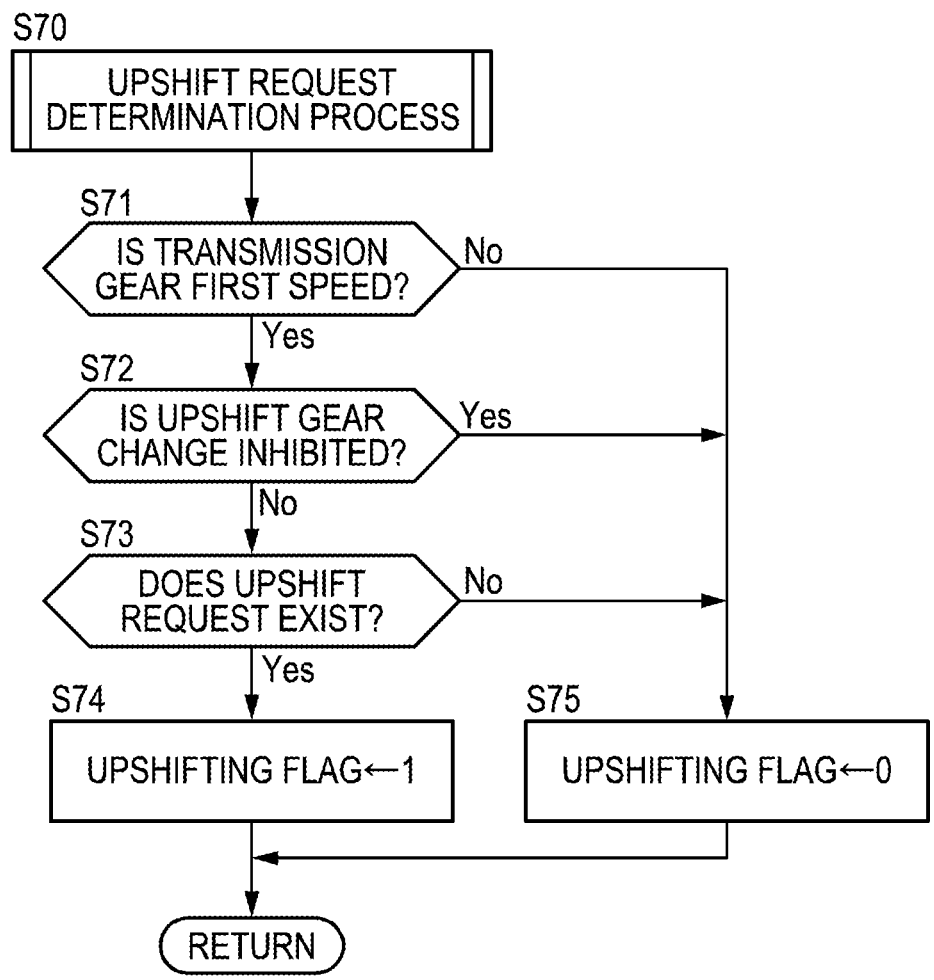
FIG. 12 is a flowchart indicating an upshift request determination process in detail.

FIG. 12 is a flowchart indicating the upshift request determination process in detail.

In Step S71, the controller 300 determines whether or not the transmission gear of the transmission 230 is the first speed. The controller 300 performs a process of Step S72 when the transmission gear is the first speed while the controller 300 performs a process of Step S75 when the transmission gear is the second speed.

In Step S72, the controller 300 determines whether or not to inhibit the upshift gear change of the transmission 230. Specifically, the controller 300 inhibits the upshift gear change when the absorbable power is less than a predetermined value. On the other hand, when the absorbable power is equal to or more than the predetermined value, the controller 300 permits the upshift gear change.

As described above, during the inertia phase in the time of the upshift gear change, the regenerative power of the travelling motor 210 is required to be recovered by the power absorption unit 400. Therefore, it is configured to inhibit the upshift gear change in the case where the absorbable power is less than the predetermined value, that is, in the case where the power absorption unit 400 does not have a sufficient margin to absorb the regenerative power of the travelling motor 210. The predetermined value can be appropriately set among values greater than the calculated regenerative power with such as a preliminarily performed experiment that calculates a level of the regenerative power of the travelling motor 210 generated during the upshift gear change in consideration of a target gear shift period, an output responsiveness of the fuel cell stack 110, and similar factor.

The controller 300 performs a process of Step S75 when the upshift gear change is inhibited, while the controller 300 performs a process of Step S73 when the upshift gear change is permitted.

Figure 13:
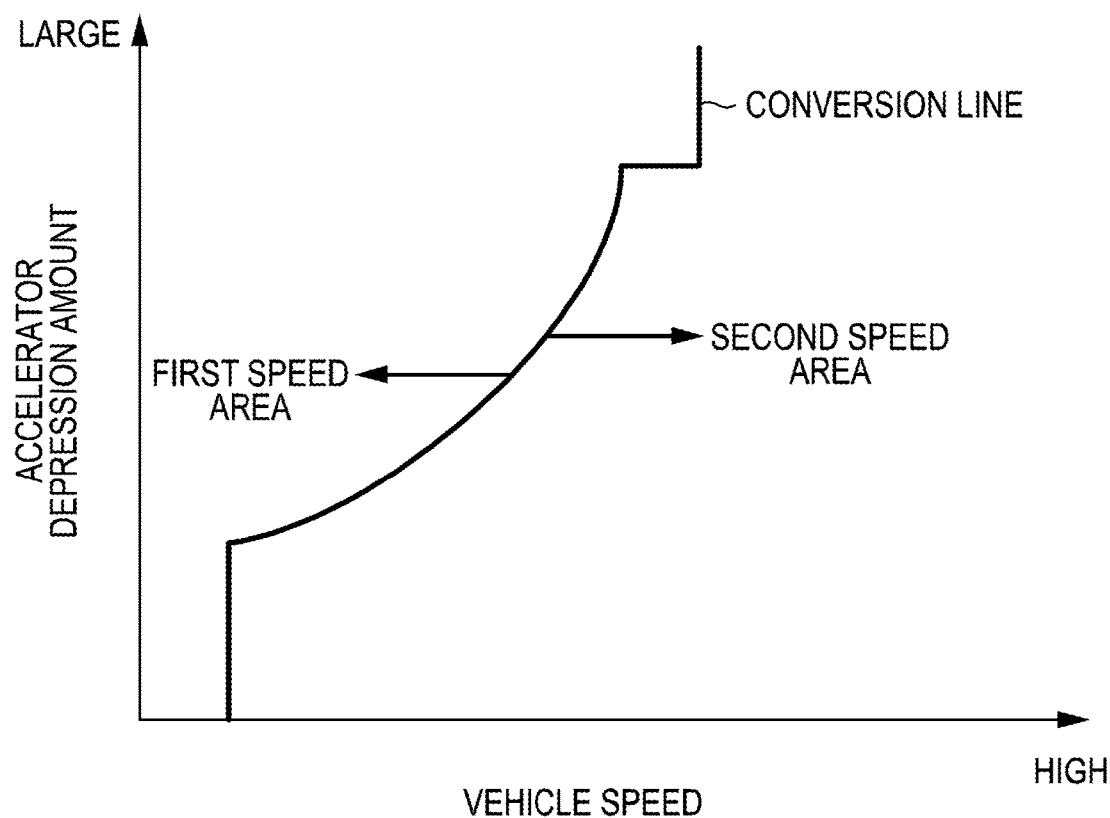
FIG. 13 is a shift map.

In Step S73, the controller 300 refers to a shift map indicated in FIG. 13 to determine whether or not the upshift request by the driver exists based on the accelerator depression amount and the vehicle speed indicating the operating state of the vehicle 1. The controller 300 determines the upshift request to exist when an operating point determined by the accelerator depression amount and the vehicle speed exists in a second speed area on the shift map of FIG. 13. The controller 300 performs a process of Step S74 when the upshift request by the driver exists, while the controller 300 performs a process of Step S75 when the upshift request by the driver does not exist.

In Step S74, the controller 300 sets an upshifting flag to 1. The upshifting flag is a flag set to 1 during the upshift gear change. This is because it is determined to be during the upshift gear change since the progress to Step S74 means a state where the current transmission gear is the first speed, the upshift gear change is not inhibited, and the upshift request exists.

In Step S75, the controller 300 sets the upshifting flag to 0.

In Step S80, the controller 300 determines whether or not it is during the upshift gear change. Specifically, the controller 300 determines whether or not the upshifting flag is set to 1. The controller 300 performs a process of Step S90 when it is not during the upshift gear change (upshifting flag=0). On the other hand, when it is during the upshift gear change (upshifting flag=1), the controller 300 performs a process of Step S110.

In Step S90, the controller 300 controls the converter 170 such that the generated power comes to the first target value.

In Step S100, the controller 300 controls the inverter 220 to control the power supplied to the travelling motor 210 such that the motor torque comes to the motor torque reference value.

In Step S110, the controller 300 determines whether or not it is during the inertia phase of the upshift gear change. In this embodiment, the controller 300 performs the determination to control the travelling motor 210 to prevent the motor torque from coming to below the motor torque lower limit value, and further, to decrease the generated power from the first target value, during the inertia phase of the upshift gear change.

Specifically, the controller 300 determines to be during the inertia phase of the upshift gear change when the actual gear ratio obtained by dividing the motor rotation speed by the output rotation speed of the transmission 230 is smaller than the gear ratio before the upshift (=first speed gear ratio). When the controller 300 determines to be during the inertia phase, the controller 300 performs a process of Step S120. On the other hand, when it is not during the inertia phase, the controller 300 performs the process of Step S90.

In Step S120, the controller 300 determines the recovery of the generated power. Specifically, the controller 300 determines whether or not the actual gear ratio obtained by dividing the motor rotation speed by the output rotation speed of the transmission 230 is decreased to less than the predetermined threshold value slightly large compared with the gear ratio after upshifting (=second speed gear ratio).

The actual gear ratio obtained by dividing the motor rotation speed by the output rotation speed of the transmission 230 is, in other words, a degree of progress of the inertia phase. When the actual gear ratio is decreased from the gear ratio before upshifting to the gear ratio after upshifting, it can be determined that the inertia phase terminates. That is, in this embodiment, the target value of the generated power is switched from the second target value to the first target value at a stage before the inertia phase terminates in consideration of a response delay of the fuel cell stack 110.

The controller 300 performs a process of Step S130 when the actual gear ratio obtained by dividing the motor rotation speed by the output rotation speed of the transmission 230 is equal to or more than the predetermined threshold value. On the other hand, the controller 300 performs a process of Step S160 to recover the generated power when the actual gear ratio obtained by dividing the motor rotation speed by the output rotation speed of the transmission 230 is decreased to less than the predetermined threshold value.

Figure 14:
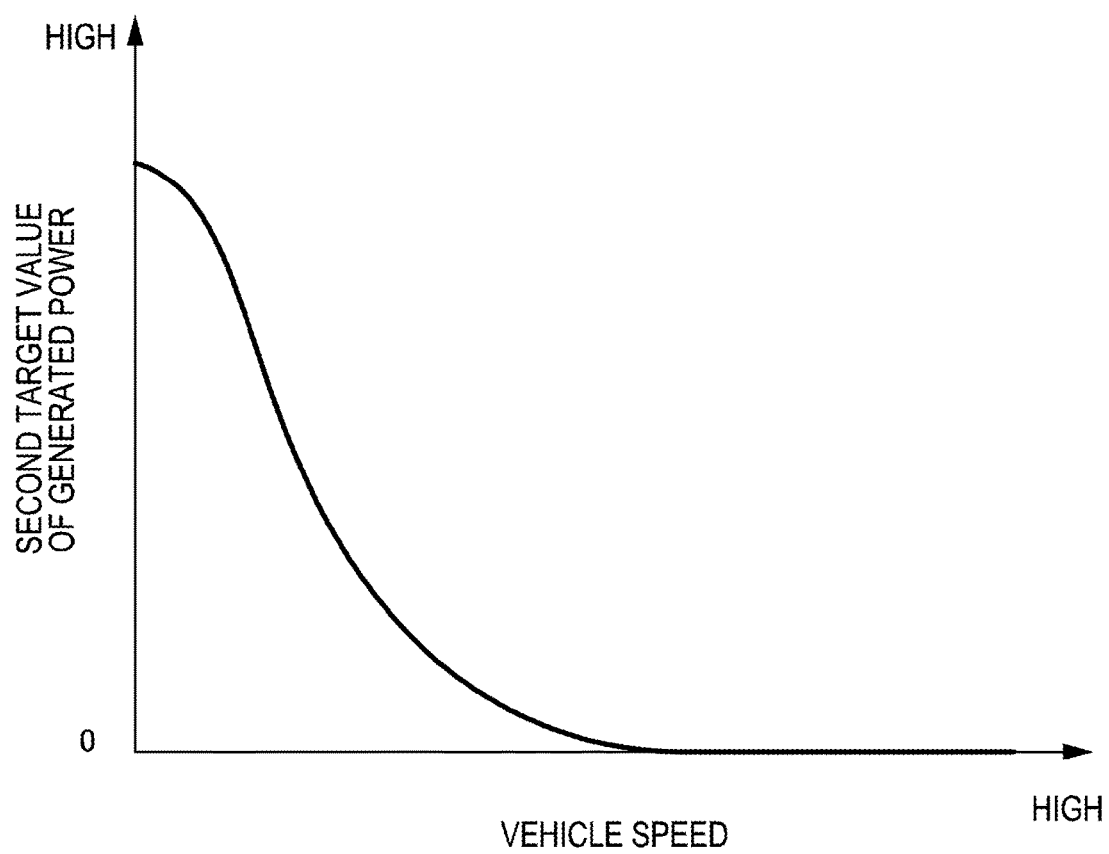
FIG. 14 is a table for calculating a second target value of the generated power.

In Step S130, the controller 300 refers to a table indicated in FIG. 14 to calculate the second target value of the generated power based on the vehicle speed, thus controlling the generated power to the second target value. As illustrated in FIG. 14, the second target value of the generated power is configured to be decreased as the vehicle speed increases.

Figure 15:
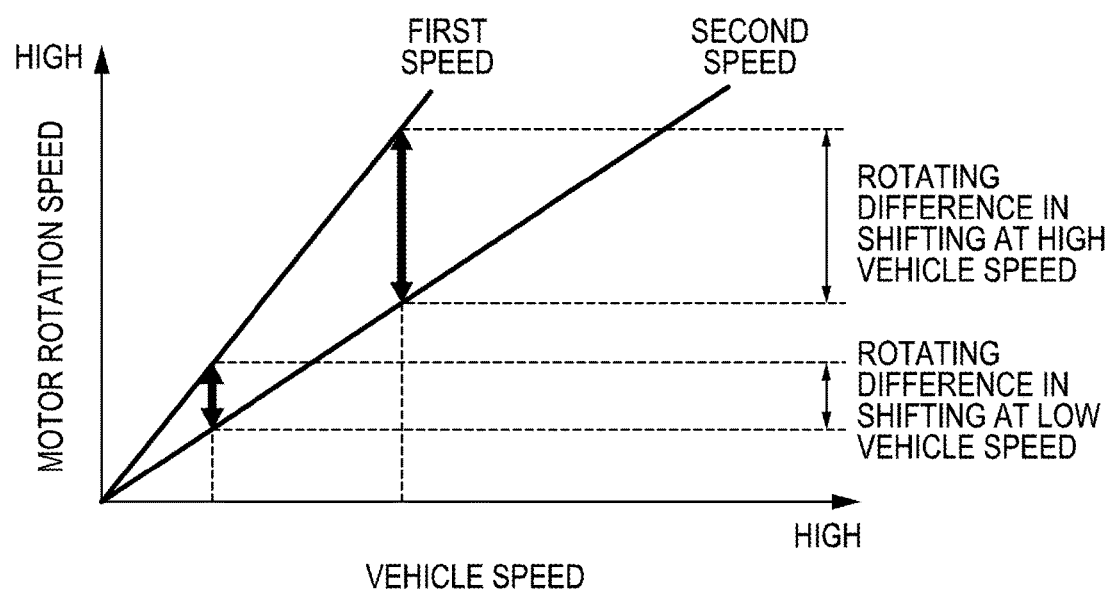
FIG. 15 is a drawing indicating a relation between a vehicle speed and a speed difference of motor rotation speeds between before and after gear shifting.

This is because the speed difference of the motor rotation speed between before and after gear shifting increases as the vehicle speed increases as illustrated in FIG. 15. That is, the more the vehicle speed increases to increase the speed difference of the motor rotation speed between before and after gear shifting, the more a range of decrease of the motor rotation speed during the inertia phase increases. Accordingly, the more the vehicle speed increases, the more the amount of the regeneration of the travelling motor during the inertia phase increases to require the generated power to be decreased. It should be noted that the second target value can be set to zero regardless of the vehicle speed.

In Step S140, the controller 300 calculates a target value (hereinafter referred to as a "motor torque target value") of the motor torque during the inertia phase of the upshift gear change. Specifically, the controller 300 calculates a greater value of a predetermined target regenerative torque T3, which are preliminarily stored in the ROM to decrease the motor rotation speed, and the motor torque lower limit value as the motor torque target value.

In Step S150, the controller 300 uses the inverter 220 to perform a shifting power control for decreasing the rotation speed of the travelling motor 210 to control the motor torque to the motor torque target value. This performs the power control on the travelling motor 210 such that the motor torque is not decreased to less than the motor torque lower limit value during the inertia phase of the upshift gear change.

In Step S160, the controller 300 controls the generated power to the first target value.

Figure 16:
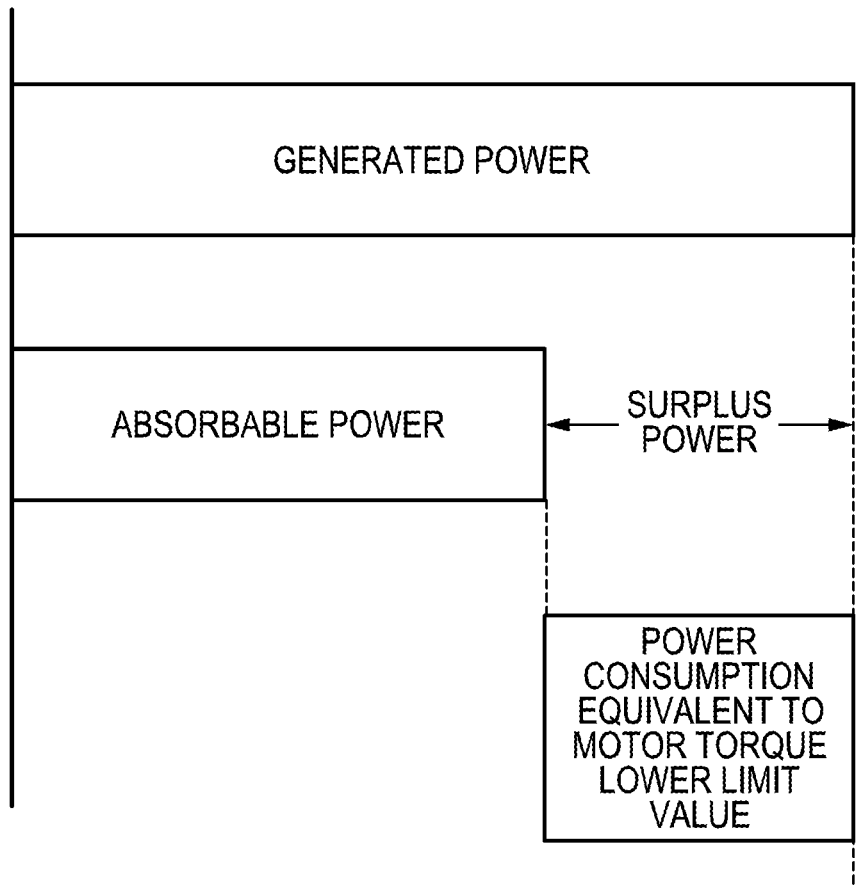
FIG. 16 is a drawing indicating a relation among the generated power, the absorbable power, and a surplus power during an inertia phase of the upshift gear change.

FIG. 16 is a drawing indicating a relation among the generated power, the absorbable power, and the surplus power during the inertia phase of the upshift gear change.

As illustrated in FIG. 16, the surplus power is obtained by subtracting the absorbable power from the generated power. In this embodiment, the motor torque necessary for consuming the surplus power is configured as the motor torque lower limit value to cause the surplus power to be consumed by the travelling motor 210. This causes the surplus power, too much for the power absorption unit 400 to absorb, in the generated power to be consumed by the travelling motor 210 to prevent the power exceeding the acceptable power from being charged in the battery 160 during the inertia phase of the upshift gear change. This prevents the battery 160 from the deterioration.

Figure 17:
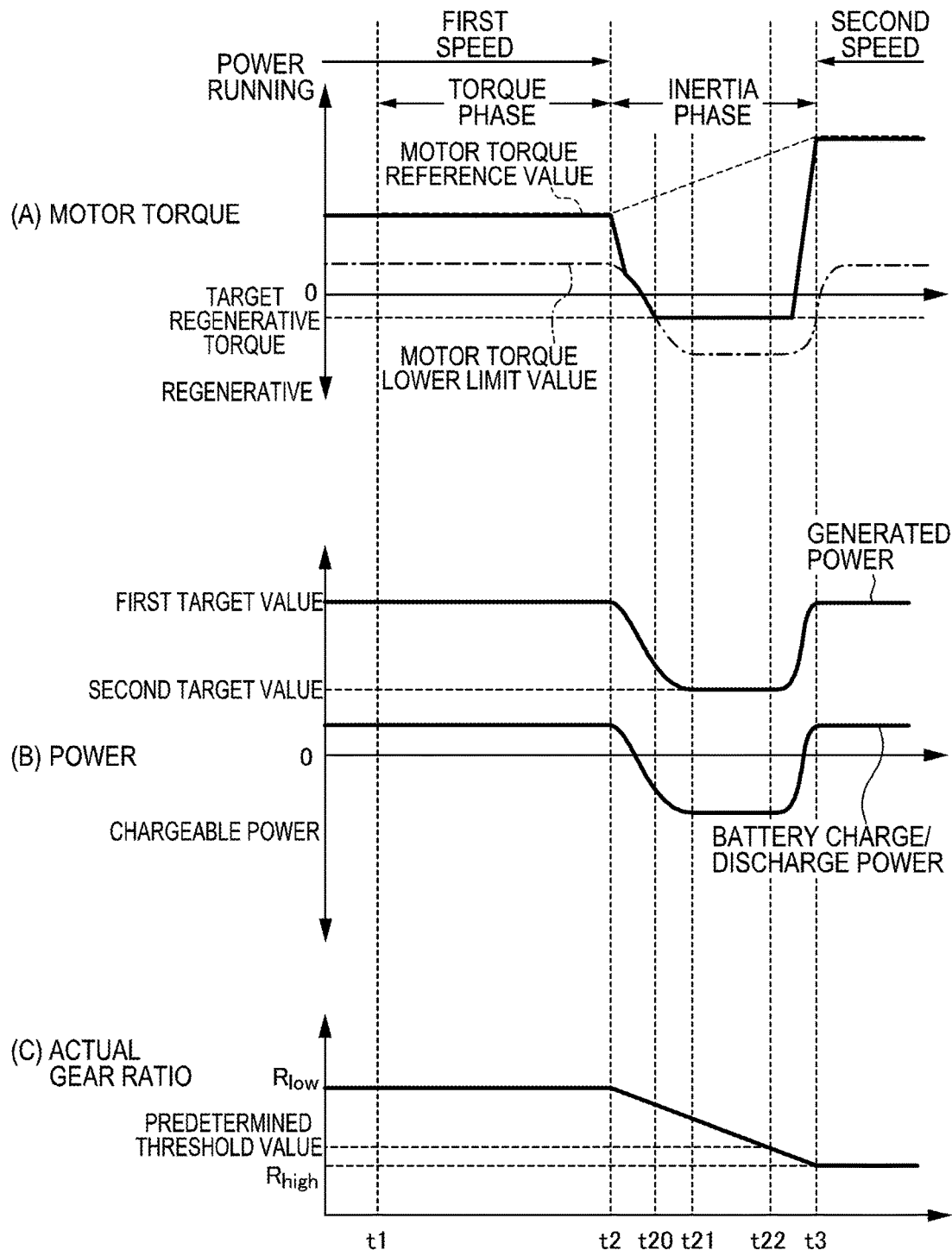
FIG. 17 is a timing chart indicating a performance of the motor torque control according to the first embodiment of the present invention.

FIG. 17 is a timing chart indicating a performance of the motor torque control according to the embodiment.

In a stage of the torque phase before the time t2, the motor torque is controlled to the motor torque reference value (required driving force÷first speed gear ratio $R_{low}$) corresponding to the driver request. Then, the generated power is controlled to the first target value as the sum of the power consumed by the travelling motor 210 when the motor torque is controlled to the motor torque reference value, the auxiliary machine power consumption, and a chargeable/dischargeable power.

When the shift phase transitions to the inertia phase at the time t2, the motor torque is controlled to a larger value of the predetermined target regenerative torque preliminarily set for decreasing the motor rotation speed and the motor torque lower limit value. Accordingly, the motor torque is controlled to the motor torque lower limit value between the time t2 and a time t20, and controlled to the target regenerative torque after the time t20. Then, at a timing of a time t3 where the inertia phase terminates, the motor torque is returned to the motor torque reference value (required driving force÷second speed gear ratio $R_{high}$) again. The generated power is controlled to the second target value smaller than the first target value.

Thus in this embodiment, between the time t2 and the time t20, the motor torque is limited to the motor torque lower limit value to decrease a speed of the decrease of the motor rotation speed in consideration of the response delay in decreasing the generated power toward the second target value. Therefore, the surplus power too much for the power absorption unit 400 to absorb can be consumed by the travelling motor 210. This prevents the power exceeding the acceptable power from being charged in the battery 160 during the inertia phase of the upshift gear change to prevent the battery 160 from the deterioration.

When the actual gear ratio decreases to the predetermined threshold value at a time t22, the generated power is controlled toward the first target value. Thus preliminarily controlling the generated power toward the first target value before the inertia phase terminates in consideration of the output response delay of the fuel cell stack 110 ensures the motor torque to increase to the motor torque reference value (required driving force÷actual gear ratio $R_{high}$) at the time t3 where the inertia phase terminates. That is, the power consumption of the travelling motor 210 after the gear shifting can be immediately compensated with the generated power at a stage where the gear shifting terminates.

With the control device of the vehicle 1 according to the embodiment described above, the following effects can be obtained.

According to the embodiment of the control device of the vehicle 1, the vehicle 1 includes the fuel cell stack 110, the travelling motor (motor-generator) 210 coupled to the fuel cell stack 110 as the driving source, the power absorption unit (power unit) 400 that can accept the generated power of the fuel cell stack 110 and the travelling motor 210, the transmission 230 disposed on the power transmission path between the travelling motor 210 and a driving wheel, and the controller 300 (motor-generator control unit, generated power control unit). The controller 300 includes the motor-generator control unit configured to perform the power control on the travelling motor 210 based on the motor torque reference value (driver request torque) as the torque target value of the travelling motor 210, and the generated power control unit configured to control the generated power of the fuel cell stack 110 based on the load of the fuel cell stack 110 including the travelling motor 210. The motor-generator control unit performs the shifting power control for decreasing the rotation speed of the travelling motor 210 during the upshift of the transmission 230, and performs the power control on the travelling motor 210 based on the motor torque lower limit value (limit torque) of the travelling motor 210 during the shifting power control. The motor torque lower limit value is calculated based on the actual generated power of the fuel cell stack 110 per unit time and the absorbable power (acceptable power) of the power absorption unit 400 per unit time.

Therefore, the surplus power, which is too much for the power absorption unit 400 to absorb, of the generated power can be consumed by the travelling motor 210. This prevents the power equal to or more than the absorbable power, which can be absorbed by the power absorption unit 400 per unit time, from being excessively supplied to the power absorption unit 400 to ensure protecting the power absorption unit 400. Thus the control device of the vehicle 1 according to the embodiment can appropriately perform a power management during the upshift gear change.

Especially, when the power absorption unit 400 is configured of the battery 160, since the power exceeding the acceptable power is prevented from being charged in the battery 160, a thermal protection of the battery 160 can be ensured. When the power absorption unit 400 is configured of the battery 160 and the vehicle auxiliary machine 180, since the absorbable power increases by the amount of the power consumption of the vehicle auxiliary machine 180 to decrease the surplus power, the motor torque lower limit value can be decreased. This decreases the motor rotation speed early during the upshift of the transmission 230, so as to reduce the gear shift period to improve the gear shift performance.

Reducing the gear shift period shorten a time period for performing a slip control by the clutch of the transmission 230 during the gear shifting, so as to ensure protecting the clutch. Since the heat generation of the clutch can be reduced, a variation of a dynamic friction coefficient by the heat generation of the clutch can be reduced to suppress a variation of the vehicle behavior (gear shift shock) in release and engagement of the clutch.

The motor-generator control unit calculates the motor torque lower limit value (limit torque) of the travelling motor 210 based on the surplus power of the fuel cell stack 110, subtracting a smaller value of the absorbable power of the power absorption unit 400 and a predetermined upper limit power (converter passing power upper limit value) that can pass through the converter (voltage regulator) 170 from the actual generated power of the fuel cell stack 110, thus restricting the speed of the decrease of the power supplied to the travelling motor 210 so as not to fall below the motor torque lower limit value during the shift control.

This restricts the converter passing power to the converter passing power upper limit value to ensure protecting the reactor as the component of the converter 170, eventually, to ensure protecting the converter 170.

The controller 300 includes a shift phase determining unit configured to determine whether or not the shift phase is the inertia phase based on the input rotation speed (motor rotation speed) and the output rotation speed of the transmission 230 during the shift control. Then, the motor-generator control unit controls the power supplied to the travelling motor 210 based on a greater value of the motor torque lower limit value and the predetermined regenerative torque, for decreasing the rotation speed of the travelling motor 210, during the inertia phase.

This controls the power supplied to the travelling motor 210 so as not to fall below the motor torque lower limit value during the shift control, thus ensuring performing an appropriate power management during the upshift gear change.

The generated power control unit controls the generated power of the fuel cell stack 110 or halts the power generation of the fuel cell stack 110 based on the vehicle speed during the inertia phase, so as to decrease the generated power.

Thus, decreasing the generated power during the inertia phase ensures gradually decreasing the surplus power (generated power-absorbable power), so as to gradually decrease the motor torque lower limit value. Therefore, since the motor rotation speed can be decreased early during the upshift of the transmission 230, the gear shift period can be shortened to ensure improving the gear shift performance.

Especially, the configuration where the generated power of the fuel cell stack 110 is decreased as the vehicle speed increases eliminates the need for decreasing the generated power much from the first target value, when the vehicle speed is low, that is, the speed difference between the input rotation speed and the output rotation speed of the transmission 230 is small to cause the regenerative power by the travelling motor 210 to be small. This ensures returning the generated power to the first target value early after the inertia phase terminates.

The shift phase determining unit determines the shift phase to be during the inertia phase when the actual gear ratio, which is obtained by dividing the input rotation speed of the transmission 230 by the output rotation speed, is decreased to smaller than the gear ratio of the transmission 230 before the upshift. Then, after the actual gear ratio is decreased to smaller than the predetermined threshold value, which is greater than the gear ratio of the transmission 230 after the upshift, the generated power of the fuel cell is ordinarily controlled based on the load of the fuel cell stack 110.

Thus controlling the generated power to the first target value before the inertia phase terminates in consideration of the output response delay of the fuel cell stack 110 ensures the generated power to be controlled to the first target value when the inertia phase terminates. Accordingly, since the motor torque can be switched to the power running operation at the termination of the inertia phase to terminate the gear shifting, the gear shift performance can be improved.

The controller 300 includes an upshift request determining unit configured to determine whether or not the upshift request of the transmission 230 exists based on the operating state of the vehicle 1, and an upshift inhibiting unit configured to inhibit the upshift of the transmission 230 when the power absorbable for the power absorption unit 400 is equal to or less than the predetermined value. Thus, since the upshift is inhibited when there is not a sufficient margin for the power absorption unit 400 to absorb the regenerative power of the travelling motor 210, the excessive power equal to or more than the absorbable power absorbable for the power absorption unit 400 is prevented from being supplied to the power absorption unit 400. This ensures protecting the power absorption unit 400.

Second Embodiment

Next, a second embodiment of the present invention will be described. This embodiment is different from the first embodiment in a point where the generated power of the fuel cell stack 110 is preliminarily decreased in a stage of the torque phase. The following mainly describes the difference. It should be noted that the following embodiments use identical reference numerals to parts that have functions identical to those of the above-described first embodiment, and therefore such elements may not be further elaborated here.

Figure 18:
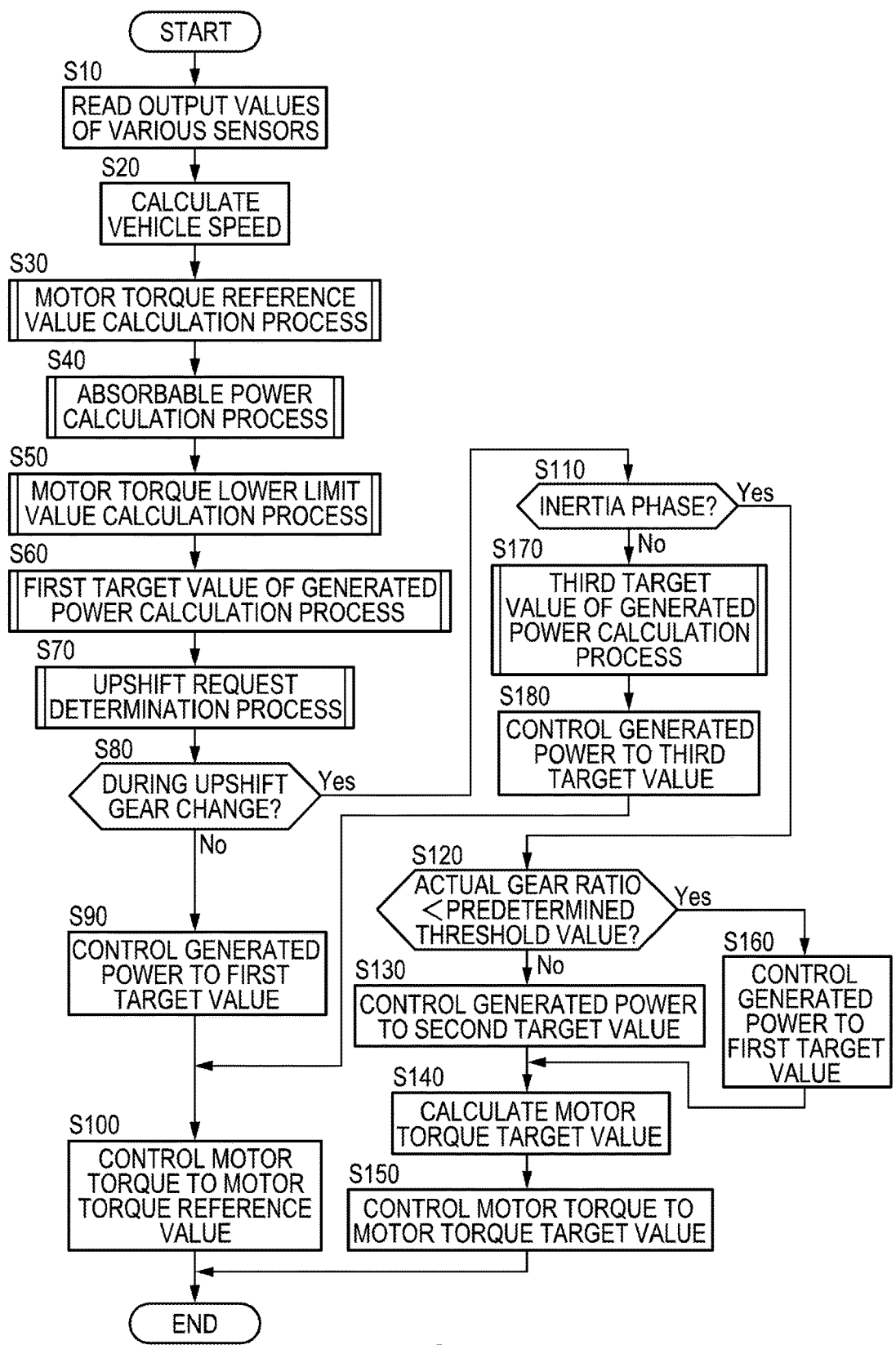
FIG. 18 is a flowchart indicating a motor torque control according to a second embodiment of the present invention.

FIG. 18 is a flowchart indicating the motor torque control according to this embodiment.

Since the processes from Step S10 to Step S160 are similar to the first embodiment, here, the contents of the processes on and after Step S170 will be described.

In Step S170, the controller 300 executes a calculation process of a third target value of the generated power. The process is a process to calculate the target value of the generated power during the torque phase before the inertia phase as the third target value.

Figure 19:
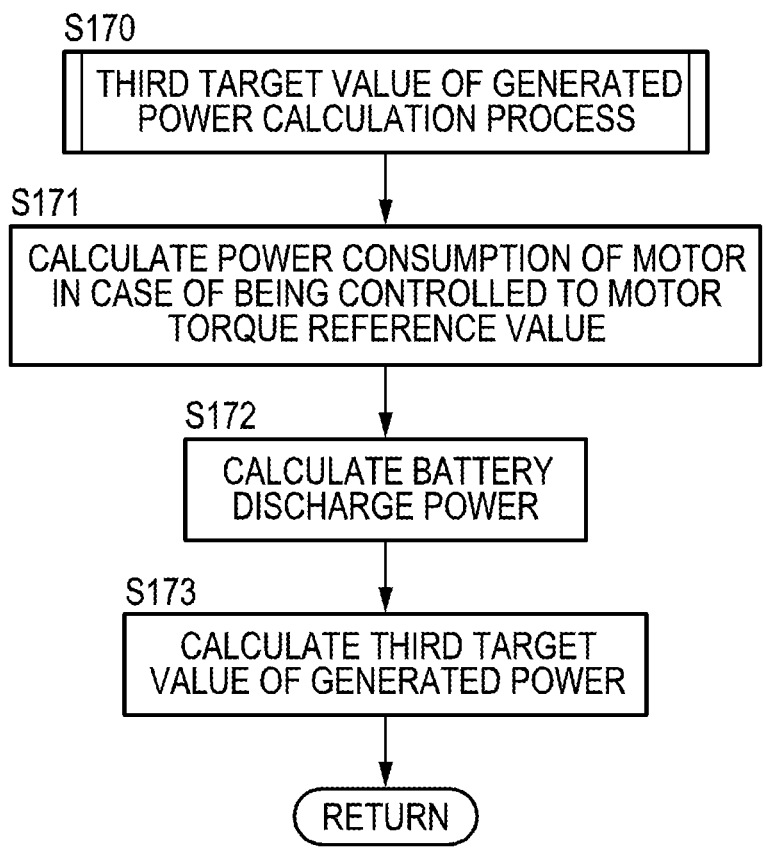
FIG. 19 is a flowchart indicating a calculation process of a third target value of the generated power in detail.

FIG. 19 is a flowchart indicating the calculation process of the third target value of the generated power in detail.

In Step S171, the controller 300 calculates a total power of the power consumed by the travelling motor 210 when the motor torque is controlled to the motor torque reference value and the auxiliary machine power consumption.

In Step S172, the controller 300 calculates an upper limit value (hereinafter referred to as a "dischargeable power") of the power that can be discharged from the battery 160 based on the battery charging level. The dischargeable power increases when the battery charging level is high compared with a case of low.

In Step S173, the controller 300 calculates a value by subtracting the dischargeable power from the total power as the third target value of the generated power.

In Step S180, the controller 300 controls the generated power to the third target value. It should be noted that a value smaller than the first target value can be determined as the target value of the generated power with the third target value as the lower limit.

Figure 20:
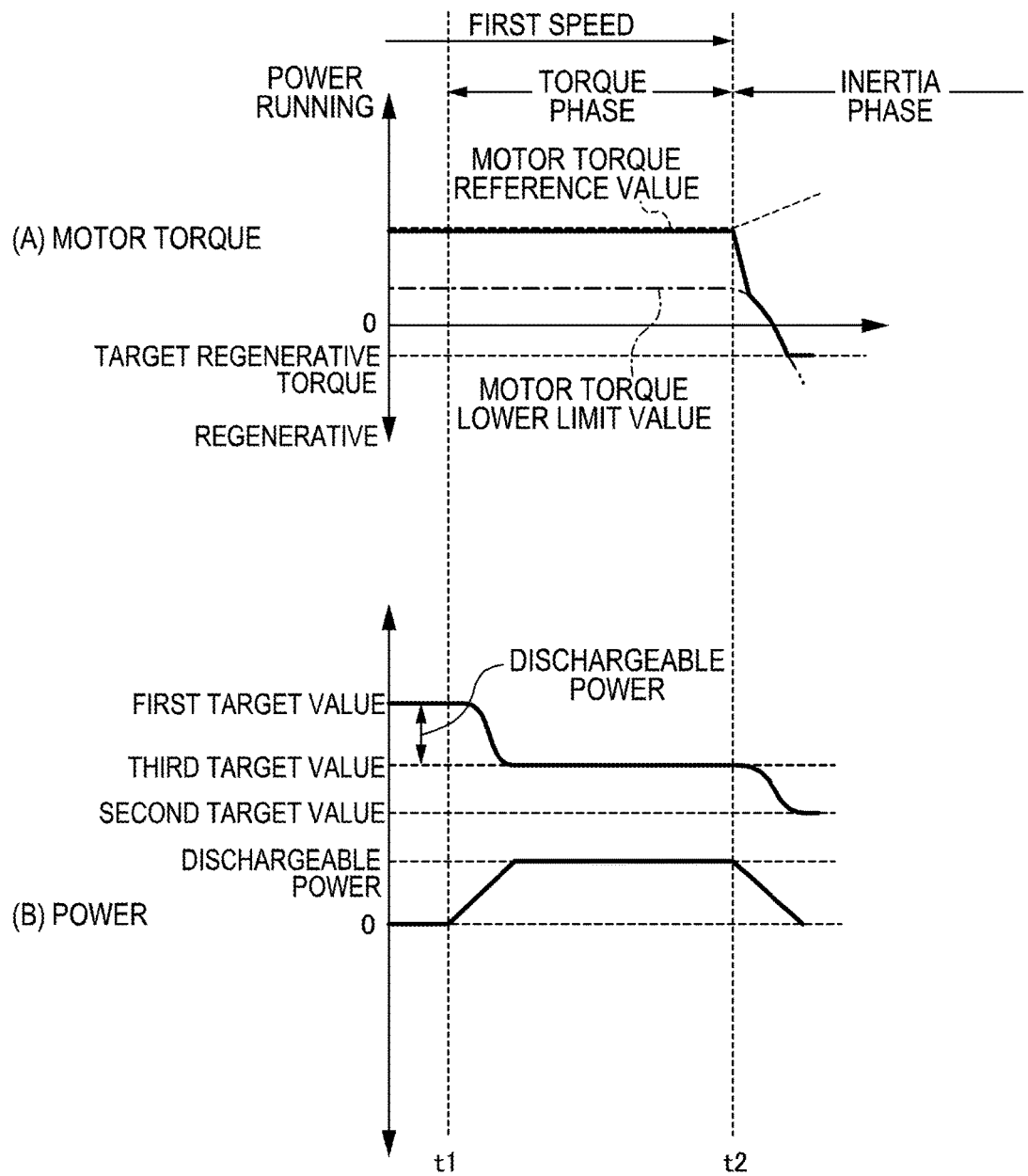
FIG. 20 is a timing chart indicating a performance of the motor torque control according to the second embodiment of the present invention.

FIG. 20 is a timing chart indicating a performance of the motor torque control according to this embodiment.

Before the time t1, the generated power is controlled to the first target value as the total power of the power consumption of the travelling motor 210 and the auxiliary machine power consumption.

At the time t1, the upshift gear change is started, and when the torque phase starts, in this embodiment, the target value of the generated power is changed from the first target value to the third target value. The third target value is a power obtained by subtracting the dischargeable power of the battery 160 from the total power of the power consumption of the travelling motor 210 and the auxiliary machine power consumption, and is a value smaller than the first target value.

Then, when the shift phase transitions to the inertia phase at the time t2, the generated power is controlled from the third target value to the second target value, and after that, the generated power is controlled similar to the first embodiment.

Thus in this embodiment, the generated power is configured to be preliminarily decreased to smaller than the first target value in a stage of the torque phase such that the travelling motor 210 and the vehicle auxiliary machine 180 are driven by the power of the battery 160 as much as possible and the shortage is compensated with the generated power during the torque phase of the upshift gear change.

The motor torque lower limit value during the inertia phase is calculated based on the surplus power obtained by subtracting the absorbable power from the generated power, and increases as the surplus power increases. Accordingly, the more the generated power before the inertia phase decreases, the more the surplus power decreases to reduce the motor torque lower limit value. Since discharging the battery 160 during the torque phase increases the absorbable power, the surplus power can be more decreased to decrease the motor torque lower limit value.

If the motor torque lower limit value can be decreased, the motor rotation speed can be quickly decreased by the decrease of the motor torque lower limit value so as to reduce the gear shift period, thus improving the gear shift performance.

With the control device of the vehicle 1 according to the above-described embodiment, the generated power control unit calculates the power value, which subtracts the power (dischargeable power) that can be output from the power absorption unit 400 from the power consumption of the travelling motor 210, as a power lower limit value (third target value) of the generated power of the fuel cell stack 110. Then, during the upshift of the transmission 230, the generated power control unit decreases the generated power of the fuel cell stack 110 with the power lower limit value as the lower limit from the start of the upshift to the determination of during the inertia phase.

This provides the efficiency similar to the first embodiment, ensures the generated power to be preliminarily decreased before the inertia phase, and ensures the absorbable power to be increased. Therefore, the surplus power can be decreased to small compared with the first embodiment to further decrease the motor torque lower limit value.

Third Embodiment

Next, a third embodiment of the present invention will be described. This embodiment is different from the first embodiment in a point where a bypass flow rate is increased to promptly decrease the generated power during the inertia phase of the upshift gear change. The following mainly describes the difference.

In each embodiment described above, when the generated power of the fuel cell stack 110 is controlled from the first target value to the second target value in Step S130, a greater value of the stack request compressor supply flow rate, which is calculated based on the target value of the generated power, that is, the second target value, and the predetermined dilution request compressor supply flow rate is set as the target compressor supply flow rate.

Then, the feedback control is performed to the cathode compressor 124 so as to cause the detected compressor supply flow rate to come to the target compressor supply flow rate, and the feedback control is performed to the bypass valve 128 so as to cause the detected stack supply flow rate to come to the stack request compressor supply flow rate. That is, the bypass valve 128 is controlled based on the target value of the generated power, and in detail, controlled so as to cause the detected stack supply flow rate to come to the stack request compressor supply flow rate calculated based on the target value of the generated power.

Accordingly, when the stack request compressor supply flow rate is set as the target compressor supply flow rate, the bypass valve 128 is fully closed. When the dilution request compressor supply flow rate is set as the target compressor supply flow rate, the bypass valve 128 is opened so as to causes the bypass flow rate to be a flow rate obtained by subtracting the stack request compressor supply flow rate from the dilution request compressor supply flow rate.

In the following description, the opening degree of the bypass valve 128 such as determined by the ordinary control based on the target value of the generated power will be referred to as an "ordinary bypass opening degree."

Figure 21:
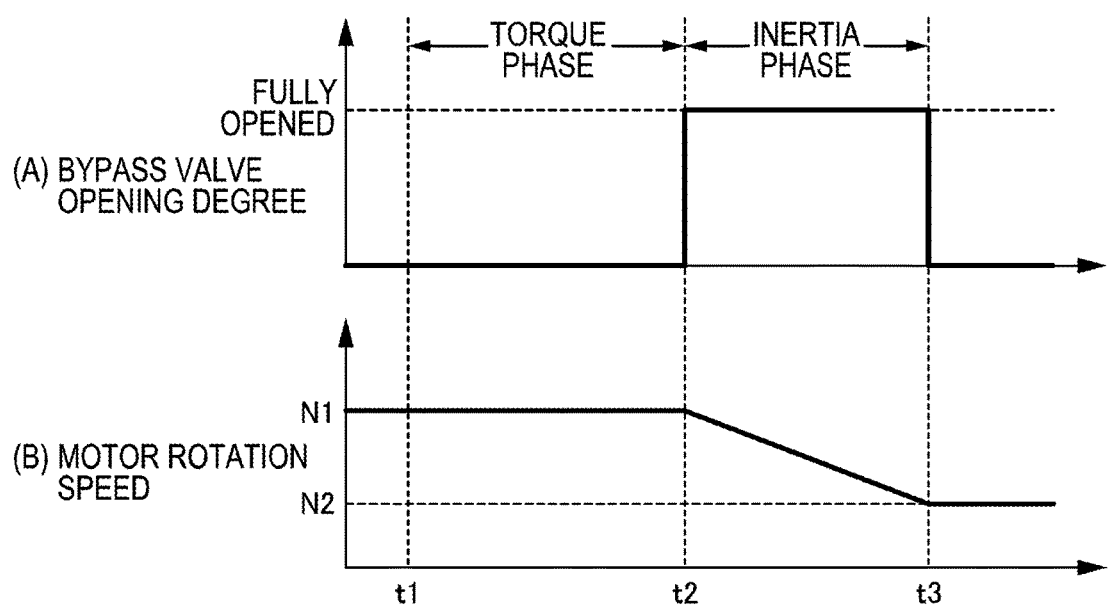
FIG. 21 is a timing chart indicating a performance of a motor torque control according to a third embodiment of the present invention.

Then, in this embodiment, as indicated in the timing chart of FIG. 21, the opening degree of the bypass valve 128 is configured to be greater than the ordinary bypass opening degree during the inertia phase of the upshift gear change. That is, when the target value of the generated power is the second target value (during the inertia phase), the opening degree of the bypass valve 128 is configured to be greater than an ordinary bypass opening degree calculated by the ordinary control. In this embodiment, the bypass valve 128 is configured to be opened from the ordinary bypass opening degree to an upper limit opening degree of the bypass valve 128 during the inertia phase of the upshift gear change.

This ensures increasing the bypass flow rate during the inertia phase of the upshift gear change to promptly decrease the stack supply flow rate, so as to promptly decrease the generated power.

According to the embodiment described above, the controller 300 (bypass valve unit, generated power control unit) includes a bypass valve unit configured to control the bypass valve 128 based on the target value of the generated power of the fuel cell stack 110. Then, the bypass valve unit causes the opening degree of the bypass valve 128 to be greater than the ordinary opening degree controlled based on the target value of the generated power of the fuel cell stack during the inertia phase.

This ensures increasing the bypass flow rate during the inertia phase of the upshift gear change to promptly decrease the stack supply flow rate, so as to promptly decrease the generated power.

Fourth Embodiment

This embodiment is different from the first embodiment in a point where the bypass flow rate is increased and the compressor supply flow rate is increased by the amount during the inertia phase of the upshift gear change to increase the power consumption of the cathode compressor 124, so as to cause the absorbable power to be increased. The following mainly describes the difference.

Figure 22:
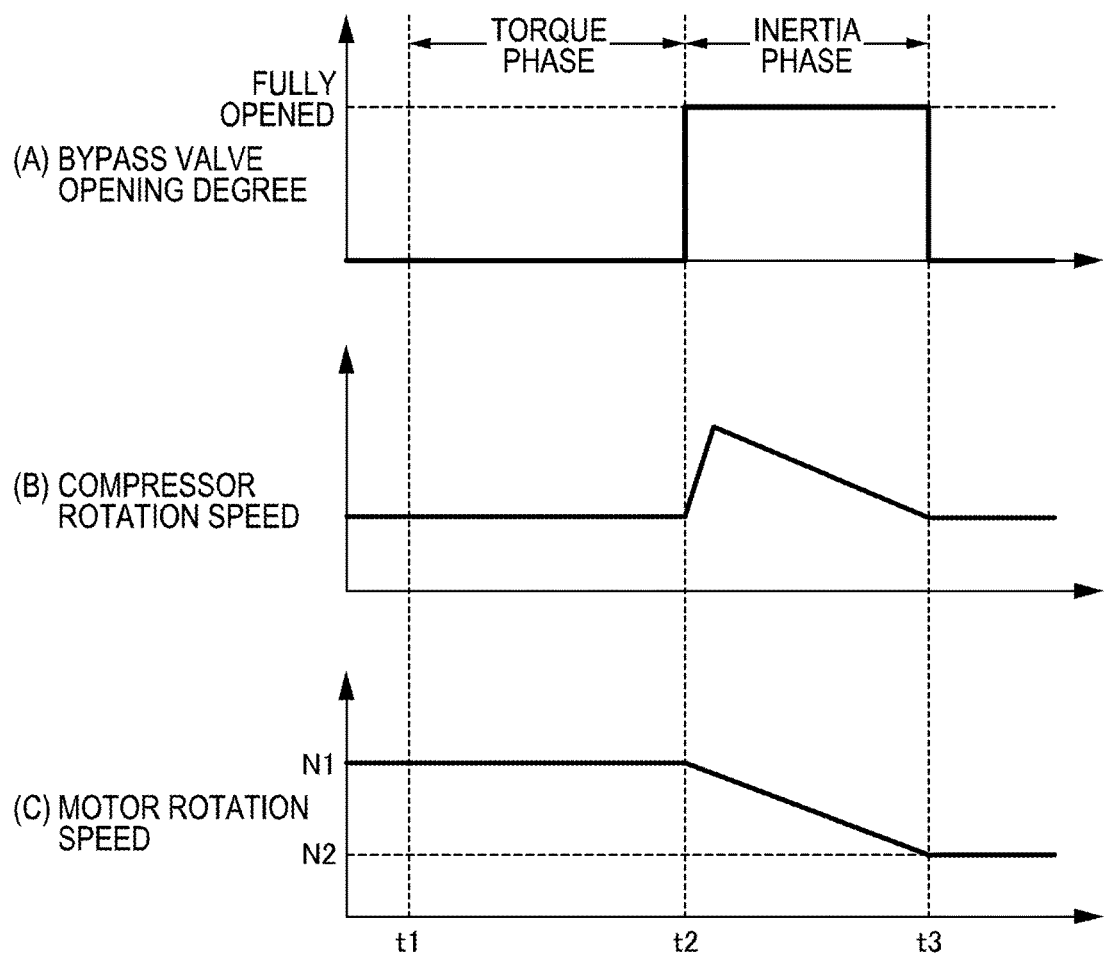
FIG. 22 is a timing chart indicating a performance of a motor torque control according to a fourth embodiment of the present invention.

In this embodiment, similarly to the third embodiment, the opening degree of the bypass valve 128 is configured to be greater than the ordinary bypass opening degree to increase the bypass flow rate during the inertia phase of the upshift gear change. Then, in this embodiment, as indicated in the timing chart of FIG. 22, the compressor supply flow rate (compressor rotation speed) is increased by the amount that the bypass flow rate is increased to increase the power consumption of the cathode compressor 124.

Thus in this embodiment, the controller 300 increases the flow rate of the cathode compressor 124 by the amount that the opening degree of the bypass valve 128 is increased during the inertia phase, so as to increase the power consumption of the cathode compressor 124. This increases the absorbable power during the inertia phase of the upshift gear change. Thus increasing the absorbable power decreases the surplus power to decrease the motor torque lower limit value.

The embodiments of the present invention described above are merely illustration of some application examples of the present invention and not of the nature to limit the technical scope of the present invention to the specific constructions of the above embodiments.

For example, the present invention is applicable to a system to control the generated power of the fuel cell stack 110 to be constant. The number of the stages of the transmission is not limited to two stages for forward, and may be equal to or more than two, or the transmission may include a gear for backward movement.

While, in the above described embodiment, the converter passing power upper limit value is taken into account in the calculation of the surplus power, the motor-generator control unit may calculate the motor torque lower limit value (lower limit torque) of the travelling motor 210 with a value obtained by simply subtracting the absorbable power (acceptable power) of the power absorption unit 400 from the actual generated power of the fuel cell stack 110 as the surplus power of the fuel cell stack 110.

The invention claimed is:
1. A control device for a vehicle, wherein
the vehicle includes:
   a fuel cell;
   a motor-generator coupled to the fuel cell as a driving source;
   a power unit configured to accept generated power of the fuel cell and the motor-generator; and
   a transmission disposed on a power transmission path between the motor-generator and a driving wheel, wherein
the control device for the vehicle comprises:
   a motor-generator control unit configured to perform a power control on the motor-generator based on a driver request torque; and
   a generated power control unit configured to control the generated power of the fuel cell based on a load of the fuel cell including the motor-generator, wherein:
the motor-generator control unit performs a shifting power control during an upshift of the transmission, setting a target regenerative torque for decreasing a rotation speed of the motor-generator in the shifting power control,
the motor-generator control unit calculates a limit torque of the motor-generator during the shifting power control based on an actual generated power of the fuel cell per unit time and an acceptable power of the power unit per unit time, and
the motor-generator control unit performs a power control on the motor-generator, limiting the target regenerative torque during an inertia phase with the limit torque of the motor-generator in the power control.

2. The control device for the vehicle according to claim 1, wherein:
the motor-generator control unit calculates the limit torque based on a surplus power obtained by subtracting the acceptable power from the actual generated power, and
the motor-generator control unit performs the power control on the motor-generator so as not to cause a torque of the motor-generator to be decreased to below the limit torque.

3. The control device for the vehicle according to claim 2, further comprising
a voltage regulator disposed between the fuel cell and the power unit to adjust an output voltage of the fuel cell, wherein
the motor-generator control unit determines the surplus power by subtracting a smaller one of the acceptable power and a predetermined upper limit power from the actual generated power, the predetermined upper limit power being allowed to pass through the voltage regulator.

4. The control device for the vehicle according to claim 2, further comprising
a shift phase determining unit configured to determine, during the upshift, whether or not a shift phase is the inertia phase based on an input rotation speed and an output rotation speed of the transmission, wherein
the motor-generator control unit performs the power control on the motor-generator during the inertia phase based on a greater one of the limit torque and a predetermined regenerative torque for decreasing the rotation speed of the motor-generator.

5. The control device for the vehicle according to claim 4, wherein
the generated power control unit controls the generated power of the fuel cell or halts the power generation of the fuel cell during the inertia phase based on a vehicle speed of the vehicle.

6. The control device for the vehicle according to claim 5, wherein
the generated power control unit decreases the generated power of the fuel cell in accordance with increase in the vehicle speed.

7. The control device for the vehicle according to claim 5, wherein:
the shift phase determining unit determines the shift phase to be during the inertia phase when an actual gear ratio is decreased to below a gear ratio of the transmission before the upshift, the actual gear ratio being obtained by dividing the input rotation speed of the transmission by the output rotation speed, and
the generated power control unit controls the generated power of the fuel cell based on the load of the fuel cell after the actual gear ratio is decreased to below a predetermined threshold value, the threshold value being greater than a gear ratio of the transmission after the upshift.

8. The control device for the vehicle according to claim 5, wherein:
the generated power control unit calculates a power lower limit value of the generated power of the fuel cell by subtracting an allowed output power of the power unit from a power consumption of the motor-generator, and
the generated power control unit decreases the generated power of the fuel cell during the upshift of the transmission so that a lower limit of the generated power of the fuel cell is the power lower limit value, from a start of the upshift to a time at which the upshift is determined to being during the inertia phase.

9. The control device for the vehicle according to claim 1,
the vehicle includes:
   a cathode gas supply passage that supplies the fuel cell with cathode gas;
   a compressor disposed on the cathode gas supply passage;
   a bypass passage that causes a part of the cathode gas to bypass the fuel cell so as to be discharged, the cathode gas having been discharged from the compressor; and
   a bypass valve disposed on the bypass passage to adjust a flow rate of the cathode gas which flows through the bypass passage, wherein
the control device for the vehicle comprises:
   a bypass valve unit configured to control the bypass valve based on a target value of the generated power of the fuel cell, wherein
the bypass valve unit, during the inertia phase, causes an opening degree of the bypass valve to be greater than an ordinary opening degree controlled based on the target value of the generated power of the fuel cell.

10. The control device for the vehicle according to claim 9, wherein
when the opening degree of the bypass valve is increased to greater than the ordinary opening degree, a flow rate of the compressor is increased so as to increase a power consumption of the compressor.

11. The control device for the vehicle according to claim 1, wherein:

the power unit includes a battery configured to be charged with the generated power of the fuel cell, and an auxiliary machine driven by the generated power of the fuel cell, and the acceptable power of the power unit is a sum of a power amount that is chargeable in the battery per unit time and a power amount consumed by the auxiliary machine per unit time.

12. The control device for the vehicle according to claim 1, further comprising:

an upshift request determining unit configured to determine whether or not an upshift request of the transmission exists based on an operating state of the vehicle, and an upshift inhibiting unit configured to inhibit the upshift of the transmission when a power absorbable for the power unit is equal to or less than a predetermined value.

13. A control method for a vehicle, wherein the vehicle includes:

a fuel cell;

a motor-generator coupled to the fuel cell as a driving source;

a power unit configured to accept generated power of the fuel cell and the motor-generator; and a transmission disposed on a power transmission path between the motor-generator and a driving wheel, wherein the control method for the vehicle comprises:

a motor-generator control step of performing a power control on the motor-generator based on a driver request torque; and a generated power control step of controlling the generated power of the fuel cell based on a load of the fuel cell including the motor-generator, wherein:

the motor-generator control step comprises:

performing a shifting power control during an upshift of the transmission, with setting a target regenerative torque for decreasing a rotation speed of the motor-generator in the shifting power control;

calculating a limit torque of the motor-generator during the shifting power control based on an actual generated power of the fuel cell per unit time and an acceptable power of the power unit per unit time, and performing a power control on the motor-generator, with limiting the target regenerative torque during an inertia phase with the limit torque of the motor-generator in the power control.

14. A control device for a vehicle, wherein the vehicle includes:

a fuel cell;

a motor-generator coupled to the fuel cell as a driving source;

a power unit configured to accept generated power of the fuel cell and the motor-generator; and a transmission disposed on a power transmission path between the motor-generator and a driving wheel, wherein the control device for the vehicle comprises:

a motor-generator control unit configured to perform a power control on the motor-generator based on a driver request torque; and a generated power control unit configured to control the generated power of the fuel cell based on a load of the fuel cell including the motor-generator, wherein:

the motor-generator control unit performs a shifting power control during an upshift of the transmission, setting a target regenerative torque for decreasing a rotation speed of the motor-generator in the shifting power control, the motor-generator control unit calculates a limit torque of the motor-generator during the shifting power control based on an actual generated power of the fuel cell per unit time and an acceptable power of the power unit per unit time, the motor-generator control unit performs a power control on the motor-generator, limiting the target regenerative torque during an inertia phase with the limit torque of the motor-generator in the power control, the generated power control unit controls the generated power of the fuel cell or halts the power generation of the fuel cell during the inertia phase based on a vehicle speed of the vehicle, and the control device for the vehicle further comprises:

an upshift request determining unit configured to determine whether or not an upshift request of the transmission exists based on an operating state of the vehicle, and an upshift inhibiting unit configured to inhibit the upshift of the transmission when a power absorbable for the power unit is equal to or less than a predetermined value.

* * * * *